United States Patent [19]

Hill et al.

[11] 4,273,488
[45] Jun. 16, 1981

[54] BALE STACKING WAGON

[75] Inventors: Amos G. Hill; Fenton J. Harder, both of Hesston, Kans.

[73] Assignee: Hesston Corporation, Hesston, Kans.

[21] Appl. No.: 912,441

[22] Filed: Jun. 5, 1978

[51] Int. Cl.³ ............... A01D 87/12; B65G 57/30; B65G 57/32
[52] U.S. Cl. ............... 414/44; 414/64; 414/95; 414/130; 414/497; 414/786
[58] Field of Search ............... 414/44, 62, 64, 92, 414/95, 96, 111, 127, 130, 497, 786

[56] References Cited

U.S. PATENT DOCUMENTS

| | | | |
|---|---|---|---|
| 3,241,696 | 3/1966 | Lundahl | 414/497 X |
| 3,289,859 | 12/1966 | Tarbox | 414/44 X |
| 3,442,400 | 5/1969 | Roth et al. | 414/95 X |
| 3,486,636 | 12/1969 | Stroup | 414/44 |
| 3,523,616 | 8/1970 | Neely | 414/44 X |
| 3,688,919 | 9/1972 | Snider | 414/44 |
| 3,826,389 | 7/1974 | Godfrey et al. | 414/44 X |
| 3,827,577 | 8/1974 | Kurk et al. | 414/64 X |
| 3,857,498 | 12/1974 | Grey et al. | 414/127 |
| 3,949,886 | 4/1976 | Harber et al. | 414/95 X |
| 4,005,784 | 2/1977 | Wilson | 414/44 |
| 4,111,312 | 9/1978 | Wilson | 414/44 X |

FOREIGN PATENT DOCUMENTS 2331868 1/1975 Fed. Rep. of Germany ............ 414/95

Primary Examiner—Leslie J. Paperner
Attorney, Agent, or Firm—Schmidt, Johnson, Hovey & Williams

[57] ABSTRACT

A multilayer, free-standing stack of bales is built from the bottom up in a machine that forms each successive layer and then raises the layer directly overhead to retaining structure that supports the layer, as well as any others above it, at a high enough elevation to avoid interference with the formation of the next layer therebelow. After the stack has been completely built by raising successive layers up to the retaining structure, the stack may be discharged out of the machine while still in an upright condition and at any selected one of a number of vertical positions, e.g., onto the ground or onto the bed of an awaiting tractor-trailer. Each layer contains a pair of end-to-end tie bales across one side of the layer that are disposed in transverse relationship to all other bales of that layer, and the tie bales of adjacent layers are disposed at opposite sides of the stack so that the bales of each layer all overlap more than one bale in an adjacent layer, thereby adding cohesiveness and integrity to the stack. Stack retrieving and single bale unloading are provided.

44 Claims, 44 Drawing Figures

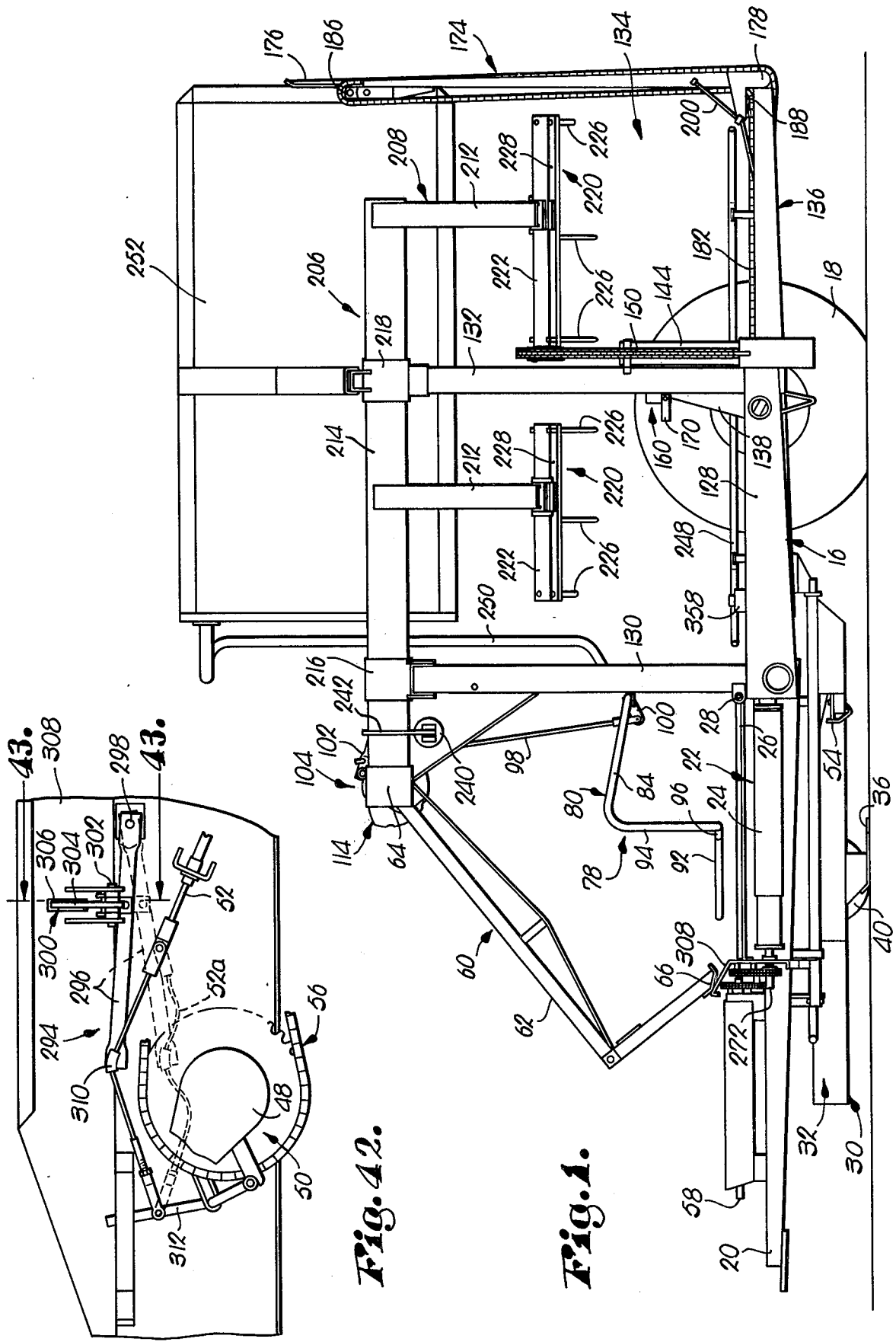

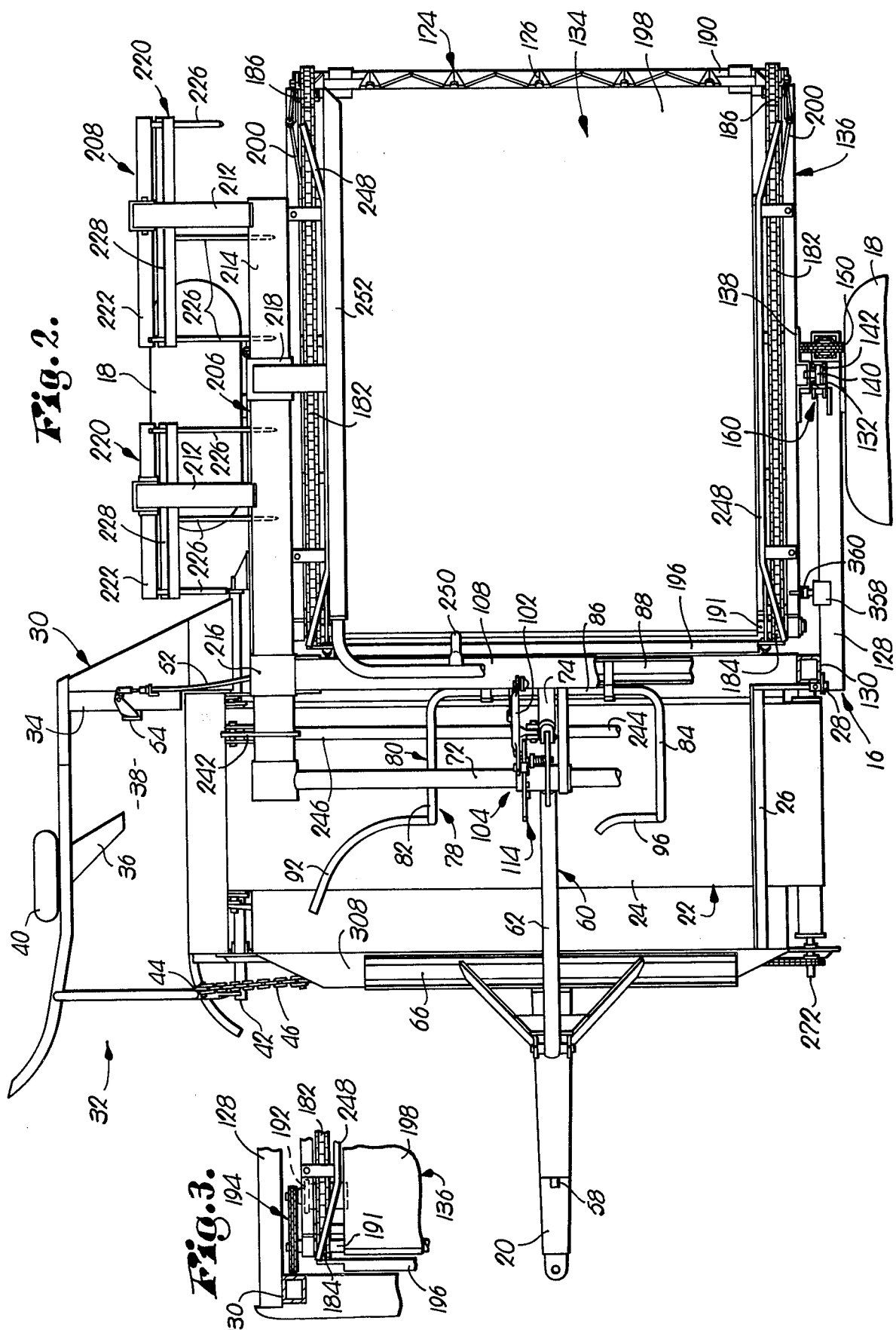

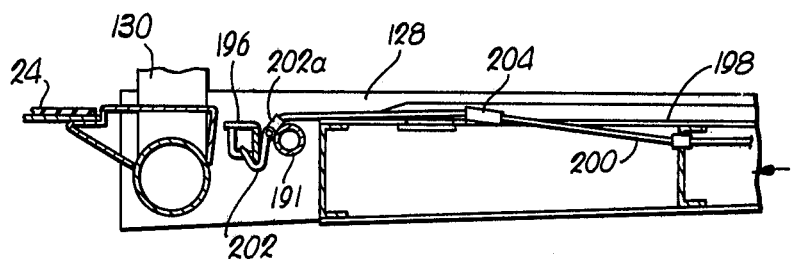
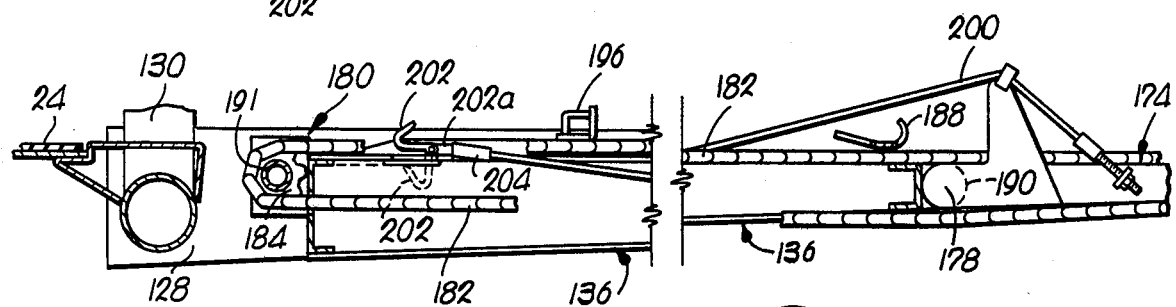
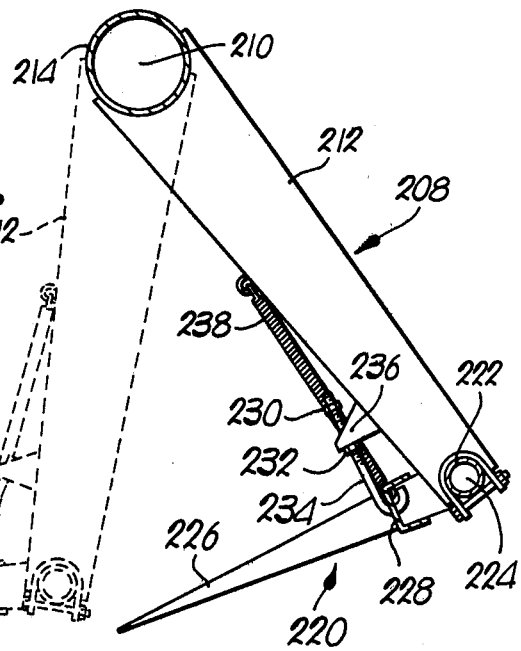
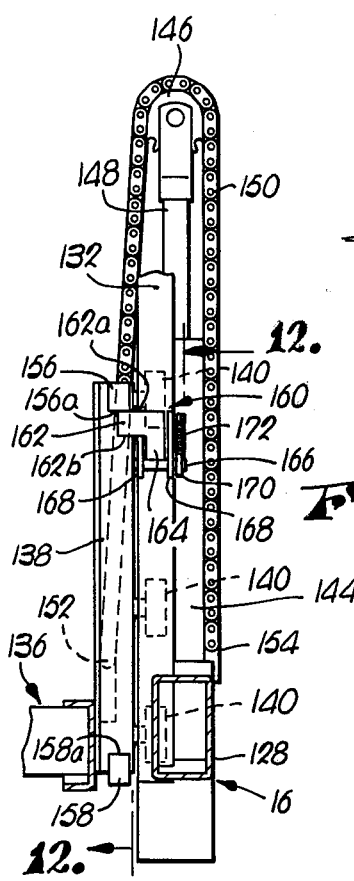
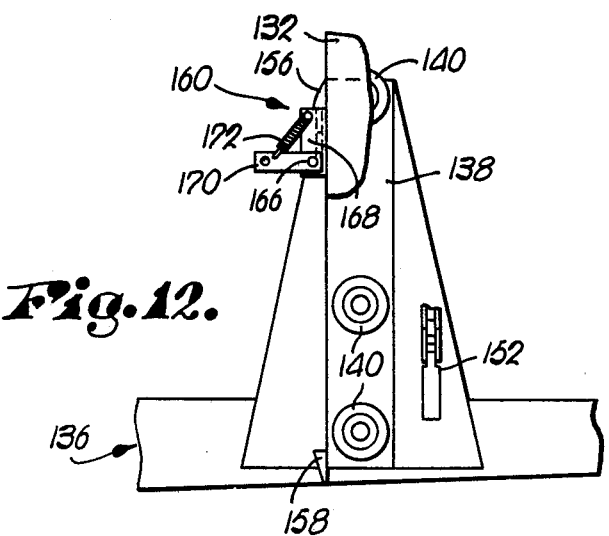

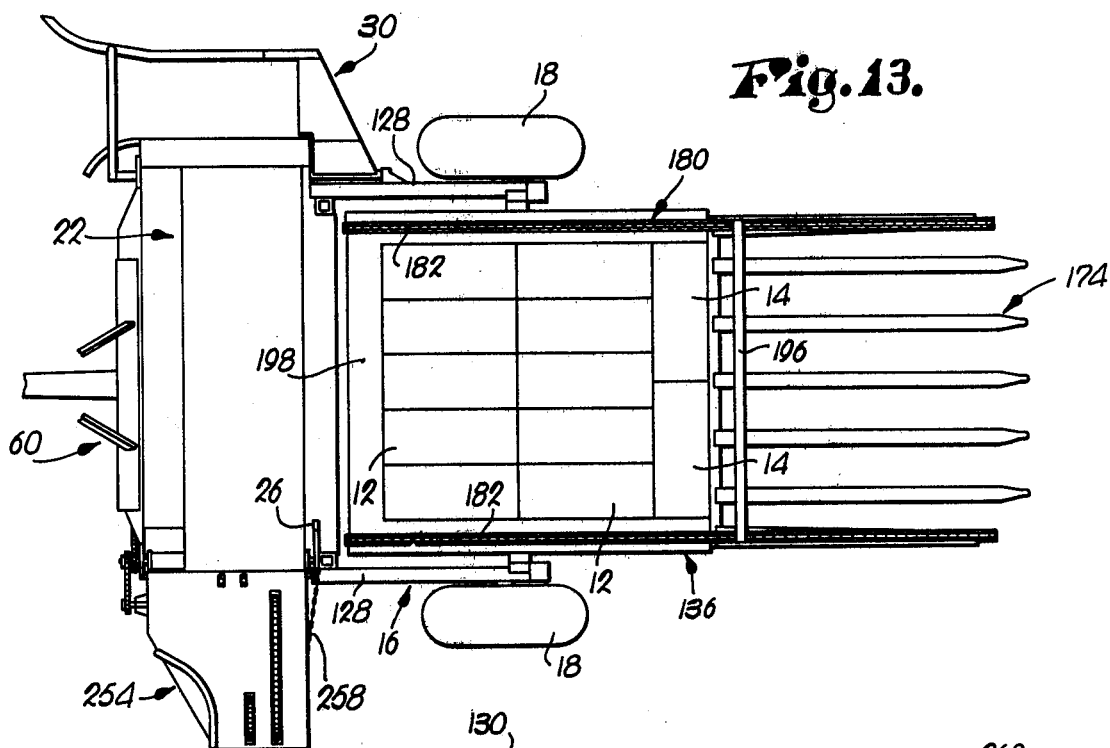
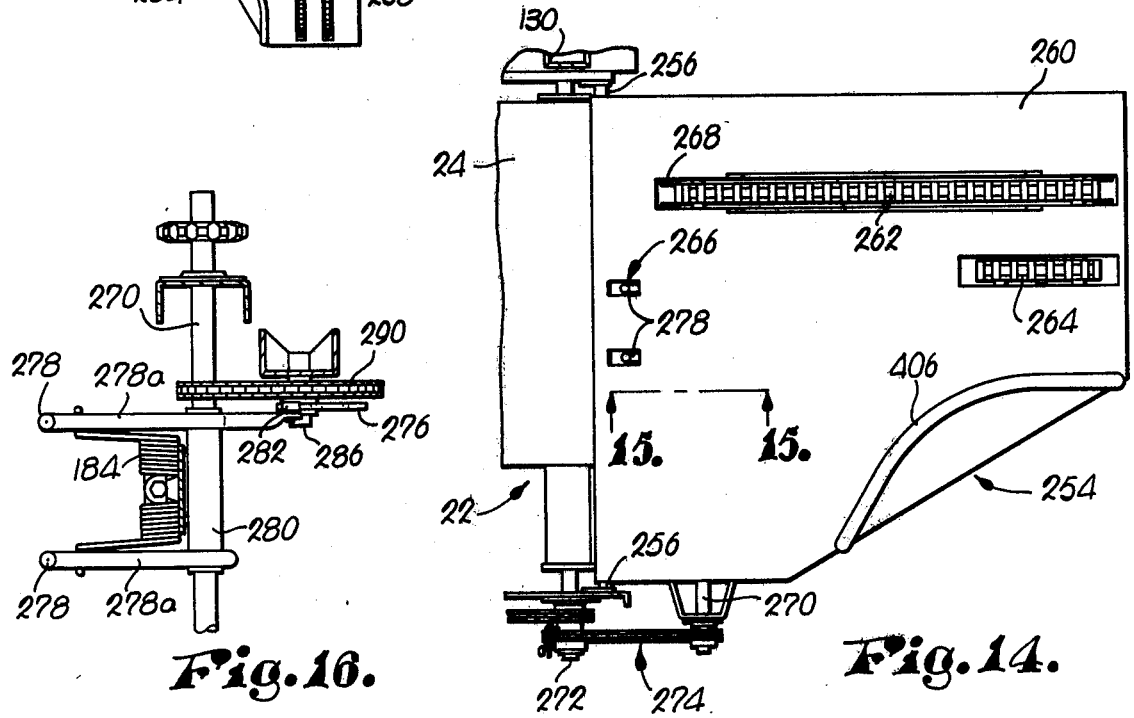
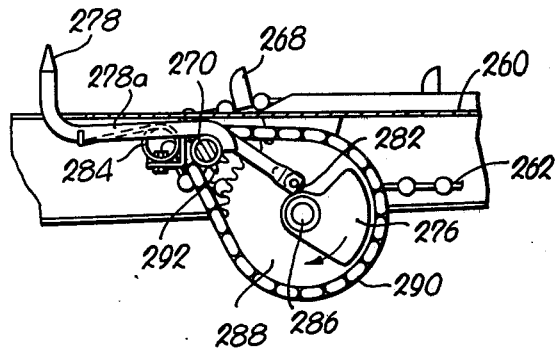

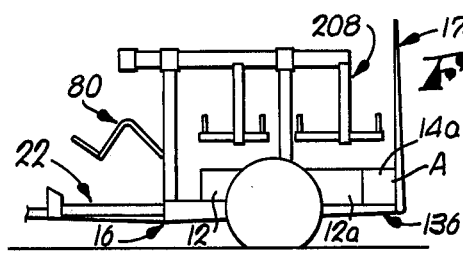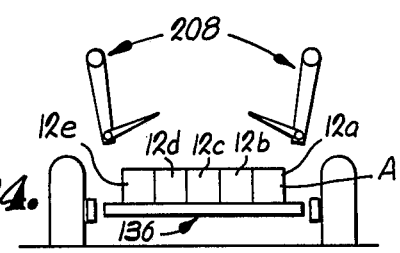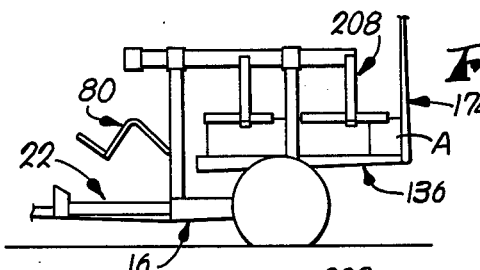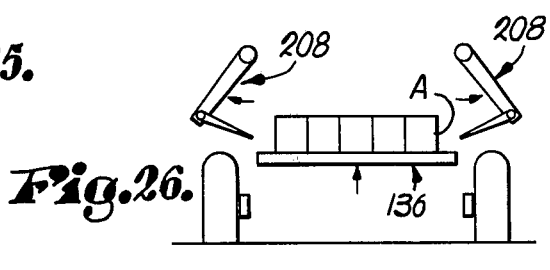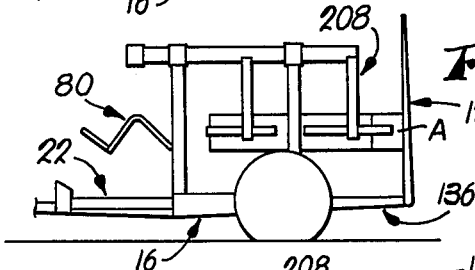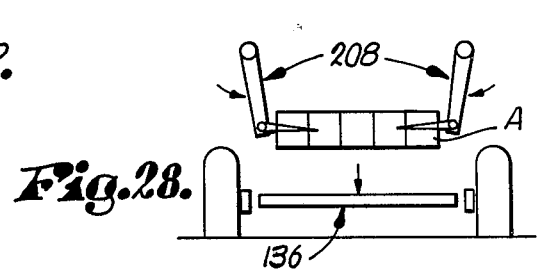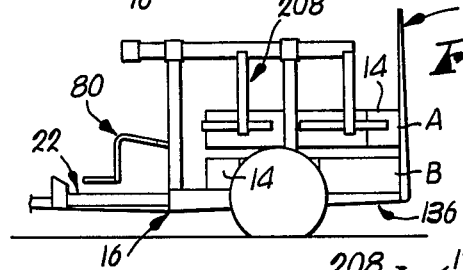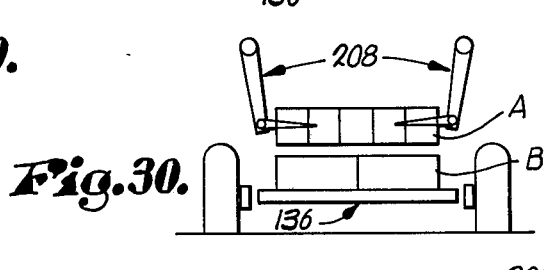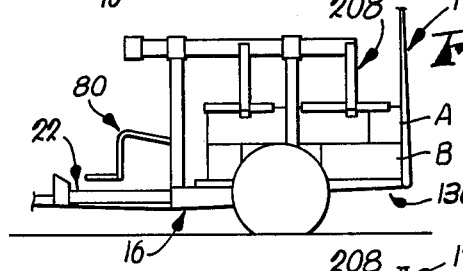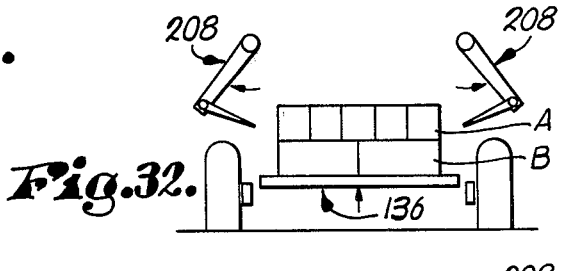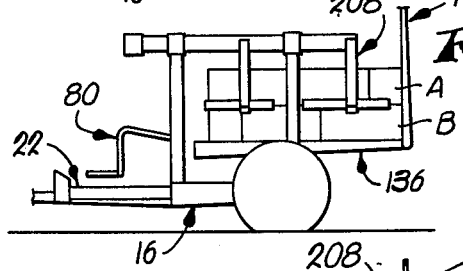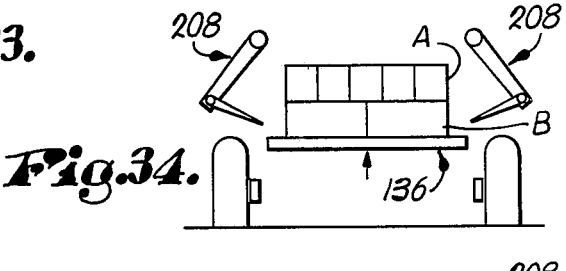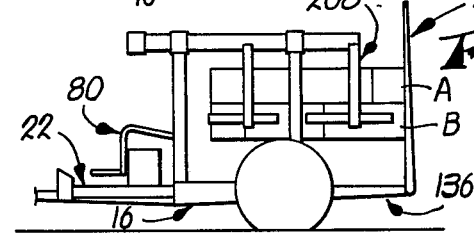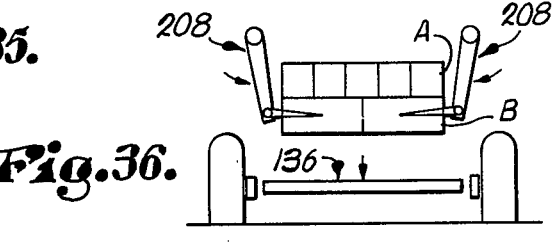

BALE STACKING WAGON

TECHNICAL FIELD

This invention relates to the agricultural arts, and, more particularly, to the field of handling harvested crops which have been compacted into bound rectangular bales.

BACKGROUND ART

Prior to the advent of automatic machines for enabling one man to drive through the field picking up bales and arranging them into a stack on the bed of the machine, making a stack from the bales was a backbreaking, time-consuming process requiring the cooperation of several laborers. While such machines have thus filled a substantial need, they have suffered from many shortcomings, not the least of which is untoward complexity leading to reliability problems and high manufacturing costs. Furthermore, the stacks produced by many prior automatic machines have been so unstable as to require auxiliary props to keep the stacks from toppling over, such propping quite frequently being insufficient to achieve its intended purpose. This obviously complicates storage and handling, not to mention the monetary losses involved as a result of crop spoilage, etc.

Many of these problems in connection with prior machines are derived from the fact that they swing the various levels of the stack, or the stack itself in toto, through certain movements either during formation of the stack or during subsequent discharge thereof from the machine. In other words, instead of building a vertical stack and arranging the various bales of the stack in such a way that they cooperatively tie one another together, prior machines have relied upon various swinging "tables" and the like, which essentially add to the stack horizontally and subsequently require the stack to be upended in order to be discharged. Consequently, the bales are moved and shifted around to various locations during the stack-building process, and are never brought to their final positions in the stack until the stack has been unloaded from the machine. Thus, the weight of the various bales and the superimposed layers are not used to advantage in forming the stack and in tightly interlocking the bales as the stack is built. Even in those situations where the only upending of the stack occurs during discharge, quality stacks comparable to, if not better than, those achievable by hand are not obtained.

SUMMARY OF THE INVENTION

The present invention contemplates building the stack as if by hand, i.e., in a vertical direction, with the exception that the bales are added to the stack at the bottom instead of at the top. Throughout the stack-building and subsequent stack-discharging steps, once the individual bales are moved into their certain positions with respect to the stack, such positions never change, and thus, by positioning the bales in their precisely proper locations during formation of each horizontal layer thereof, one is assured that they will remain in such positions and cooperate to interlock one another to provide a stack of great stability.

As the machine is advanced through a field, successive bales are picked up and ultimately arranged into a layer containing two groups of side-by-side bales extending in one direction, and a third group of end-to-end bales extending transversely of the other bales along one side of the layer. This layer is then raised directly overhead to retaining structure that takes the layer from the bed on which the layer was formed and allows the bed to return down to its original position, whereupon the layer-forming process is repeated, but this time with the transverse bales located at the opposite side of the layer. This second layer is then elevated to the retaining structure, which thereupon supports not only the newly formed layer, but also the preceding layer.

The layer-forming and raising steps are repeated several times over in order to progressively build the stack until finally, when the last layer of the stack is formed, the bed is raised to remove all of the retained layers from the retaining structure so that those previously retained are not placed on top of the last layer. Thereupon, off-loading mechanism may be activated to displace the upright stack off the bed and onto the ground or any other supporting structure, depending upon the level selected for the bed at that particular discharging operation.

During the layer-forming process and after pickup from the field, the bales are placed onto a cross conveyor where they accumulate into a group preparatory to the group being indexed onto the layer-forming bed. During such movement by the conveyor, certain of the bales are turned in such a way as to be properly oriented for subsequent use as the transverse "tie" bales of a layer, and the means for effecting such turning of these certain bales is actuated in response to a certain number of actuations of the indexing device that moves the bales off the conveyor and onto the bed, thereby relieving the operator of the need to monitor the process and manually set the stage for actuation of the turning means.

Previously discharged stacks may be retrieved by the machine for transport and relocation purposes. Furthermore, the bales of any stack on the machine may be unloaded one bale at a time using a process substantially similar to a reversal of the stack-building process.

BRIEF DESCRIPTION OF THE DRAWINGS

FIG. 1 is a side elevational view of a machine constructed in accordance with the principles of the present invention and capable of carrying out our novel method;

FIG. 2 is a top plan view thereof;

FIG. 3 is a fragmentary, slightly enlarged detail view of the right front corner of the bed of the machine illustrating the drive for the off-loading mechanism;

FIG. 8 is an enlarged, fragmentary vertical cross-sectional view of the stack off-loading mechanism and the endgate control cable showing the interrelationship between said mechanism and said cable;

FIG. 9 is a view similar to FIG. 8, but illustrating the way in which the endgate control cable may be detached from the off-loading mechanism when the endgate is lowered;

FIG. 10 is an enlarged transverse fragmentary vertical cross-sectional view illustrating details of one jaw of the layer-retaining structure, the dotted lines indicating the full inward position of such jaw during retention of a layer;

FIG. 11 is a fragmentary, enlarged vertical cross-sectional view looking rearwardly along the right side of the machine from approximately the center thereof, and illustrating the means for controlling vertical reciprocation of the bed;

FIG. 12 is a fragmentary view of the bed and associated reciprocating means shown partially in cross section and partially in elevation, and taken generally along line 12—12 of FIG. 11;

FIG. 13 is a top plan view of the machine on a reduced scale and illustrating the same in readiness for single bale unloading;

FIG. 14 is an enlarged, fragmentary top plan view of the feeder for single bale unloading;

FIG. 15 is an enlarged, fragmentary cross-sectional view of the intermittently operating gate associated with the single bale unloading feeder and taken substantially along line 15—15 of FIG. 14;

FIG. 16 is an enlarged, fragmentary plan view of the gate of FIG. 15, with the top panel of the feeder removed for clarity;

FIGS. 23-36, inclusive, are schematic, corresponding side elevational and front end elevational views of the machine, illustrating successive steps in the building of the stack from the layers formed on the bed;

FIG. 42 is a fragmentary elevational view of a lockout assembly along the front of the machine utilized in connection with a clutch for the bale pickup to prevent actuation of the pickup unless the indexing device is in its home position clearing the cross conveyor, this arrangement being an alternative embodiment to that illustrated in FIGS. 1-41.

DETAILED DESCRIPTION

Figure 17:
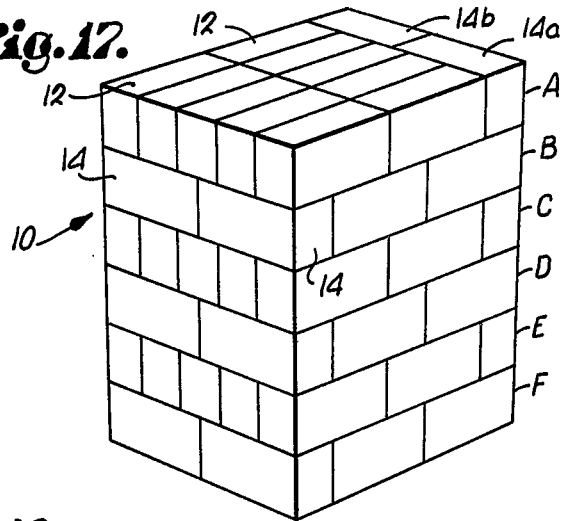
FIG. 17 is a front perspective view of a stack built in accordance with the principles of the present invention.

The machine of the present invention has particular utility in building a stack of bales of the type illustrated in FIG. 17 and denoted by the numeral 10. The stack 10 has six horizontal layers of bales designated by the letters A through F, inclusive, each of which contains two groups of "longitudinal" bales 12 and one group of "transverse" or "tie" bales 14. As illustrated, for example, in layer A, there are preferably five longitudinal bales 12 in each group thereof, while there are preferably two transverse bales 14 in each group thereof. Adjacent layers of the stack 10 are so arranged that the transverse bales 14 are located on opposite sides of the stack as may be clearly seen comparing layers A and B, for example. This results in a stable stack in which all of the bales cooperate with one another to interlock the same in place. Preferably, although not necessarily, the bales of the stack 10 are all placed on "edge" with their binding twine or wire encircling the same in horizontal planes rather than in vertical planes, as would be the case if the bales were placed on one or the other of their major faces. As is well-understood by those skilled in the art, the opposite edges of each bale are somewhat narrower than the opposite major faces thereof, and each bale is substantially longer than its width across a major face. Furthermore, although the stack 10 is four-sided, two of its sides are longer than the two remaining sides by the width of one bale placed on edge.

The machine has a chassis 16 supported by a pair of ground-engaging wheels 18 on opposite sides thereof for movement along the ground. A tongue 20 at the front of the chassis 16 is adapted at its forwardmost end for connection with a suitable towing vehicle (not shown). Disposed immediately behind the tongue 20 is a cross conveyor 22 including a continuous platform belt 24 that is driven transversely of the direction of machine travel from right to left when the machine is viewed from the rear thereof. Bale accumulating means in the form of a barrier 26 extends across the left end of the conveyor 22 and is normally in its down position as illustrated in FIG. 1, but may be swung upwardly to an upright position clearing the conveyor 22 by virtue of a pivot 28 securing the rear end of the barrier 26 to the chassis 16.

At the opposite end of the conveyor 22 is located a bale pickup 30 adapted for receiving groundlying bales as the machine is advanced and placing the bales one at a time onto the adjacent end of the conveyor 22. As illustrated perhaps best in FIGS. 2 and 4, the pickup 30 is generally U-shaped when viewed in top plan, having a mouth 32 at its front end for receiving the bales and a transverse stop 34 across its rear end for limiting further rearward movement of a received bale relative to the pickup 30. A blade 36 extending horizontally inwardly into the reception area 38 from the outboard side of the pickup 30 is disposed substantially at ground level by means of an outrigger wheel 40, the entire pickup 30 being vertically swingable about an inboard, fore-and-aft extending axis defined by the shaft 42. By keeping the blade 36 at ground level, the same is in position to slide beneath an incoming bale for purposes of providing lifting support for the latter during actuation of the pickup 30.

A crank 44 on the pickup 30 for raising and lowering the latter is operated by a chain 46 leading to the intermittently operated part 48 (FIG. 4) of a conventional dog clutch 50 located at the front of the machine in generally horizontal alignment with the conveyor 22. The dog clutch 50 is in turn controlled by a cable 52 leading to a mechanical sensor 54 on the transverse stop 34 which is operable to engage the clutch 50 when a received bale in the pickup 30 is disposed sufficiently rearwardly to depress the sensor 54. Operating power for the clutch 50 is supplied through a drive train assembly broadly denoted by the numeral 56 that is ultimately coupled with a drive shaft 58 which extends along the tongue 20 a short distance above the latter and is adapted to be connected with the power takeoff shaft (not shown) of the towing vehicle. One complete revolution of the part 48 of clutch 50 results in swinging the pickup 30 from the lowered position of FIG. 4 to the fully raised position of FIG. 19 and thence back down to the fully lowered position.

An indexing device 60 above the conveyor 22 substantially centrally of the latter is periodically operable to move accumulated bales off the conveyor 22 in a rearward direction into a stack-building area yet to be described. The device 60 comprises a generally reversely L-shaped arm 62 swingably mounted adjacent its uppermost end for fore-and-aft swinging movement about a transverse, horizontal axis 64. The arm 62 at its lowermost end has a transversely extending cross-head 66 that extends parallel to the longitudinal axis of the conveyor 22 along a substantial portion thereof. As illustrated best in FIGS. 5, 6 and 7, the arm 62 at its upper end has a crank 68 that is fixed to a transverse sleeve 70 rotatably surrounding a transversely extending structural pipe 72 whose longitudinal axis corresponds with the axis of swinging movement 64 of the device 60. The rearwardly extending crank 68 is in turn operably coupled with a hydraulic power cylinder 74 connected to an upright 76 of the chassis 16. Cylinder 74 is operable to swing the arm 62 between its home position illustrated in FIG. 1 on the forward side of the conveyor 22 and a full throw position illustrated in phantom in FIG. 7 and schematically in FIG. 21, wherein the crosshead 66 is located slightly rearwardly of the conveyor 22.

Figure 4:
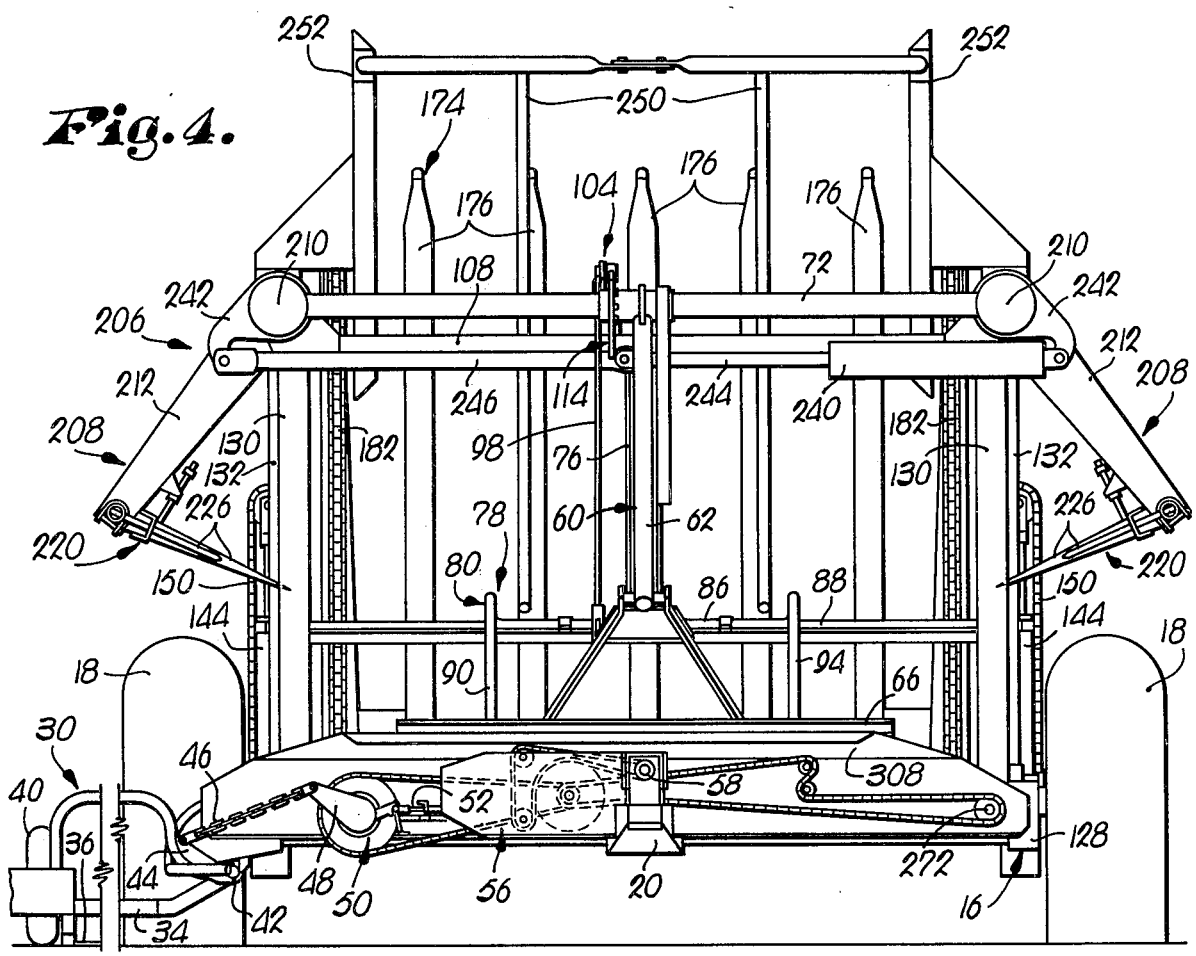
FIG. 4 is a front elevational view of the machine.

Certain of the bales placed on the conveyor 22 must be turned with respect to certain others, and for this function a bale orienting unit 78 is provided in association with the conveyor 22. The unit 78 includes a specially formed member 80 that is U-shaped in top plan as seen in FIG. 2, having a pair of spaced apart legs 82 and 84 which extend transversely of the conveyor 22 when the unit 78 is in its down position as illustrated in FIGS. 1, 2 and 4. The member 80 also has a bight 86 that integrally interconnects the two legs 82 and 84 at their rear ends, the bight 86 being rotatably attached to a cross member 88 of the chassis 16 at a point above the conveyor 22 for vertical swinging movement of the member 80 between the lowered position of FIGS. 1, 2 and 4 and a fully raised, bale-clearing position. The leg 82 includes a downturned portion 90 remote from the bight 86 which terminates in a curved tip 92 located within the path of travel of bales along the conveyor 22 when the member 80 is lowered. Similarly, the leg 84 includes a downturned portion 94 that terminates in a horizontally extending curved tip 96 at the same level as tip 92 and in the same path of travel of the bales. The tips 92 and 96 are inwardly curved with respect to the path of travel of the bales so that their convex surfaces are disposed for engagement with the bales for turning and guiding purposes yet to be explained. As noted in FIG. 2, the tip 92 is substantially longer than the tip 96, although the tip 96 is substantially a copy of the tip 92 over the existing length of the tip 96.

The orienting unit 78 further includes an upwardly extending link 98 that is connected at its lower end with a crank 100 on the member 80 and is connected at its upper end to the outer end of a following lever 102, the latter forming a part of control means for the unit 78 broadly denoted by the numeral 104. The inner end of the lever 102 is pivoted to an upright stud 106 carried on another cross member 108 of the chassis 16 for up-and-down swinging movement about a transverse horizontal axis 110. A roller 112 at the outer end of the lever 102 followingly engages a cam disc 114 forming a further part of the control means 104.

Figure 7:
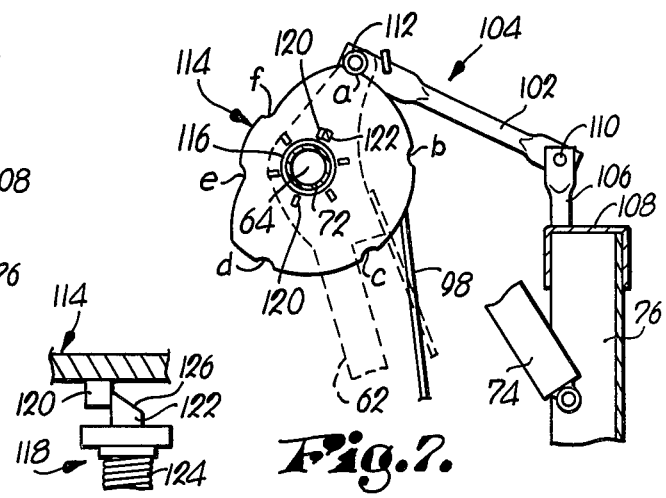
FIG. 7 is a cross-sectional view similar to FIG. 5, but with the indexing arm removed for clarity and shown in its full throw position by dotted lines, the cam having been rotated one position beyond that of FIG. 5.

The cam 114 is fixed to a central hub 116 which in turn is rotatably mounted on the structural pipe 72 adjacent and in abutting engagement with the sleeve 70 associated with the indexing arm 62. While the hub 116 is not connected to the sleeve 70 so that cam 114 is rotatable independently of the crank 68 of the indexing arm 62, there is a driving ratchet 118 provided between the crank 68 and the cam 114 to advance the cam 114 one increment of travel during each actuation of the indexing arm 62 by the hydraulic cylinder 74, such incremental travel being permitted in one direction only by the ratchet 118. To this end, the face of the cam 114 most adjacent the crank 68 is provided with six circumferentially spaced projections 120 (see enlarged detail view 7A, as well as FIG. 7) that are drivingly engaged by a spring-loaded pawl 122 on the crank 68 and the sleeve 70. The spring 124 associated with the pawl 122 yieldably biases the latter sufficiently toward the projections 120 as to enable a leading edge of the pawl 122 to come into driving engagement with the backside of a projection 120 when the indexing arm 62 is swung to its full throw position, as illustrated in FIG. 7. This stroke of the arm 62 thus effects counterclockwise rotation of the cam 114 viewing FIG. 7 through sixty degrees of travel, there being a chamfer 126 on the opposite side of the pawl 122 that induces the pawl 122 to retract against the action of spring 125 as the arm 62 returns to its home position and the chamfer 126 rides against the next succeeding projection 120.

The cam 114 has a series of six notches a through f spaced about its periphery at sixty degree intervals for receiving the roller 112 of the following lever 102. While the notches a, b, c and d are all equally radially spaced from the axis of rotation 64 of the cam 114, the notches e and f are spaced substantially further inwardly at a common radial distance from the axis 64. As should be readily apparent, the vertical position of the lever 102 determines whether or not the bale-engaging member 80 of the orienting unit 78 is raised or lowered, the weight of the member 80 serving to yieldably bias the same toward its lowered position, and thus keep the lever 102 engaged against the periphery of the cam 114.

Figure 39:
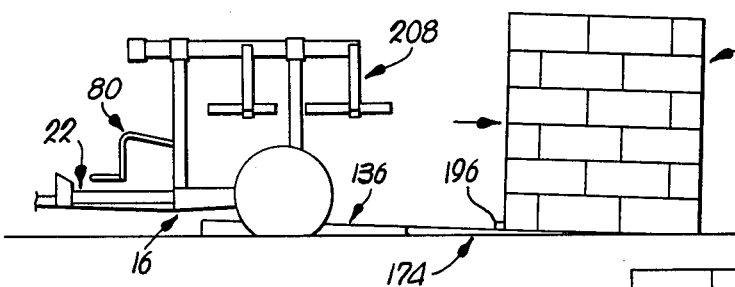
FIG. 39 is a view similar to FIGS. 37 and 38, but illustrating the stack during the process of its discharge onto the ground.

In addition to the various structural members hereinabove described, the chassis 16 also includes a pair of rearwardly extending beams 128 that are spaced apart transversely of the path of travel of the machine on opposite sides of the latter and which are joined at their rear ends with the ground wheels 18. There are also a pair of uprights 130 at the front ends of the beams 128, plus a pair of uprights 132 adjacent the rear ends of the beams 128. Generally speaking, these structural members of the chassis 16 cooperate to define a largely cubical stack-building area 134 located behind the cross conveyor 22 and between the side beams 128. Within this area 134, a horizontal bed 136 is situated for vertical reciprocation between a lowermost, ground level position as illustrated in FIG. 39 and an uppermost position illustrated in FIG. 40. Note that the bed 136 is approximately twice as long as the side beams 128 so as to project substantially rearwardly of the wheels 18.

As illustrated best in FIGS. 2, 11 and 12, the bed 136 has a pair of generally triangular guide posts 138 situated approximately midway between the front and rear of the bed 136 on opposite lateral sides of the latter and rising upwardly therefrom for a certain distance. Such guideposts 138 each carry a series of three rollers 140 spaced apart vertically therealong with are received within a track 142 formed in the inwardly facing side of the uprights 132 (see FIG. 2). The tracks 142 on the uprights 132, in cooperation with the rollers 140, thus guide the bed 136 for rectilinear, vertical reciprocation, the power for such reciprocation being provided by a pair of upright hydraulic motors 144 rising from opposite ones of the side beams 128 alongside of the uprights 132. A sprocket 146 at the upper end of the ram 148 of each motor 144 is entrained by the loop of a chain 150 anchored at one end 152 on the triangular guidepost 138 and at its opposite end 154 to the proximal side beam 128. Manifestly, extension and retraction of the rams 148 causes reciprocation of the bed 136 through the chains 150.

During the stack-building process, the bed 136 normally reciprocates between only a pair of upper and lower limits corresponding to what may be termed a layer-transferring position (upper) and a layer-forming position (lower). In this regard, and as perhaps illustrated best in FIGS. 11 and 12, each of the guideposts 138 has a pair of upper and lower abutments 156 and 158, respectively, at opposite upper and lower extremes of the guideposts 138. An inversely L-shaped limit stop 160 on each of the uprights 132 has a normally horizontally extending leg 162 projecting inwardly toward the area 134 a sufficient extent to lie in the path of travel of the abutments 156 and 158 during their movement with the bed 136. When the limit stop 160 is in the position illustrated in FIG. 11, the upper surface 162a of the leg 162 is in disposition to limitingly engage the lower surface 156a of the upper abutment 156. Likewise, the lower surface 162b is in disposition to engage the upper surface 158a of the lower abutment 158 when the bed 136 is raised appropriately. When the upper abutment 156 is engaged with the limit stop 160 in the manner shown in FIG. 11, the bed 136 is located in its so-called layer-forming position, while when the abutment 158 is up against the limit stop 160, the bed 136 is in its so-called layer-transferring position.

Figure 40:
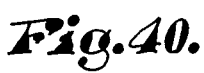
FIG. 40 illustrates the way in which a stack may be discharged onto the bed of a transport truck if such is desired.

Although the bed 136 thus normally reciprocates between the two just-mentioned positions during stack-building, there are times when it is necessary to lower the bed 136 entirely to the ground or raise the same above the layer-transferring position such as during off-loading of a stack as illustrated in FIGS. 39 and 40. Accordingly, the limit stop 160 is designed so as to be selectively shiftable out of the path of travel of the abutments 156 and 158. To this end, a vertically extending leg 164 of the limit stop 160 carries a transverse pin 166 at its lower end that is journaled by a pair of ears 168 on opposite sides of the leg 164. The limit stop 160 is thus adapted for swinging movement into and out of the position shown in the various figures about the axis of the pin 166, the latter having an operating lever 170 fixed to the outboard end thereof which is in turn yieldably biased toward the position illustrated in the Figs. by a tension spring 172 connected to a proximal one of the ears 168. The operating lever 170 may be connected via an operating cable or the like to the cab of the towing vehicle so as to permit the operator to selectively pull the limit stops 160 out of their normal limiting positions. Note that the abutments 156 and 158 are provided with appropriately curved or beveled surfaces for aiding in return of the bed 136 to its normal operating limits from either above or below the same, the spring 132 serving to bias the limit stop 160 toward its proper limiting disposition as the spring 132 is momentarily overridden by the returning abutment 156 or 158.

The bed 136 is provided with an endgate 174 across the rear of the latter in the nature of a series of cantilever-supported, laterally spaced apart tines 176. The tines 176 are integrated into a unified structure adjacent their innermost ends, and the resulting endgate 174 is attached to the bed 136 for swinging movement about a transverse axis 178 between a fully upright position as illustrated, for example, in FIG. 1, and a substantially horizontal position in which the endgate 174 extends substantially rearwardly as a continuation of the bed 136 as illustrated, for example, in FIGS. 38, 39 and 40. The tines 136 are not joined to one another adjacent their outer tip ends, such as to render each of the tines 176 slightly independently movable relative to one another as may be necessary during efforts to shove the tines 176 underneath a stack for retrieval purposes.

The bed 136 and the endgate 174 are provided with stack off-loading mechanism broadly denoted by the numeral 180 and generally taking the form of a slatted conveyor. To this end, the mechanism 180 includes a pair of endless conveyor chains 182 on opposite lateral sides of the bed 136, each of the chains 182 being wrapped around a respective sprocket 184 adjacent the front end of the bed 136, a sprocket 186 adjacent the tip of the endgate 174, and around a pair of intermediate sprockets 188 and 190 adjacent the pivoting axis 178 of the endgate 174. The two front sprockets 184 are interconnected by a common drive shaft 191 which in turn is coupled with a reversible rotary hydraulic motor 192 adjacent the right front corner of the bed 136 as illustrated in FIG. 3 via a connecting chain and sprocket assembly 194. As shown perhaps most clearly in FIGS. 2, 8 and 9, a slat 196 traverses the floor 198 of the bed 136 and is connected at its opposite ends to the chains 182 so as to be moved by the latter during actuation thereof by the hydraulic motor 192.

Swinging of the endgate 174 between its raised and lowered positions is conveniently accomplished utilizing the available power from the off-loading mechanism 180. In this respect, a pair of cables 200 are connected to the two outermost tines 176 of the endgate 174 at a distance from the swinging axis 178 that will enable the cables 200 to gain a leverage advantage on the endgate 174 when the cables 200 are pulled. Each cable 200 is guided forwardly alongside of the floor 198 of the bed 136 in a position to avoid interference with the corresponding chain 182 during operation of the latter. However, at the front of each cable 200, a hook 202 is provided as illustrated best in FIGS. 8 and 9, such hook 202 being normally caught by the forward side of the cross slat 196 as in FIG. 8. Rearward movement of the cross slat 196 from its position in FIG. 8 results in effectively paying out the cables 200 so as to permit the endgate 174 to descend by gravity until such time as the rear ends 202a of the hooks 202 come into engagement with proximal respective guides 204 for the cables 200, whereupon further movement of the hooks 202 with the slat 196 is precluded as illustrated in FIG. 9. Hence, although the off-loading mechanism 180 may continue to operate, the endgate 174 cannot be lowered any further. As shown in FIG. 9, each of the hooks may be selectively rotated to an inoperable position as indicated by phantom lines in which position the hooks 202 cannot engage the slat 196 during its rearward or forward movement. This becomes significant insofar as single bale unloading of a stack is concerned as will be later described.

In addition to the various types of apparatus heretofore described, the machine also includes what may broadly be termed retaining structure denoted by the numeral 206 and located generally above the bed 136. Such structure 206 includes a pair of swingable jaws 208 on opposite sides of the bed 136 that are swingable about respective fore-and-aft axes 210 toward and away from one another between fully retracted, layer-releasing positions as illustrated, for example, in FIG. 4 and in solid lines in FIG. 10, and fully inserted layer-retaining positions as illustrated, for example, by the phantom position in FIG. 10. Each of the jaws 208 includes a pair of fore-and-aft spaced support arms 212 which depend from and are fixed at their upper ends to a fore-and-aft extending tube 214 journaled by a pair of sleeves 216 and 218 at the upper ends of the uprights 130 and 132, respectively. The longitudinal axis of the tube 214 coincides with the axis 210 of swinging movement of each jaw 208, there being one of the arms 212 on each fore-and-aft side of the central upright 132 along each side of the machine. Each jaw 208 further includes a pair of spike assemblies 220 swingable attached to the lower ends of the arms 212 and extending generally transversely thereof inwardly toward the stack-building area 134. Each of the spike assemblies 220 includes a fore-and-aft extending pipe 222 across the lower end of its corresponding arm 212 and rotatably carried thereby for rotation about a fore-and-aft axis 224. The pipe 222 serves as a mounting member for three spikes 226 that are spaced apart along the same and extend transversely therefrom inwardly toward the stack-building area 134. A reinforcing structural channel 228 spans the three spikes 226 a short distance inboard of the corresponding arm 212 so as to further rigidify the assembly 220, and swinging movement of each assembly 220 about its axis 224 is limited to the extent permitted by a pair of spaced apart shoulders 230 and 232 along a rod 234 secured at its lower end to the channel 228 and telescopically received adjacent its upper end by a lateral lug 236 on the arm 212. Disposition of the lug 236 between the two shoulders 230 and 232 enables the lug 236 to cooperate with the shoulders 230 and 232 in providing the aforementioned swinging limits for the assembly 220. A tension spring 238 extending between the channel 228 on the one hand and a point on the upper end of each arm 212 on the other hand serves to yieldably bias the assembly 220 toward its upwardly swung position, wherein the lower shoulder 232 abuts the lug 236 as illustrated in solid lines in FIG. 10.

The jaws 208 are swung toward and away from one another through the provision of a double-acting, rectilinear hydraulic motor 240 situated across the front of the machine and connected at its opposite ends to a pair of cranks 242 that are in turn fixed to the tubes 214 adjacent their forwardmost ends. The ram 244 of the motor 240 has an extension 246 connected thereto so as to effectively lengthen the ram 244 and enable the cranks 242 to be operably connected to the opposite ends of the motor 240.

The machine is also provided with various guides for assisting in control of the bales and the various layers of the stack during formation. To this end, for example, the bed 136 has a pair of guide rails 248 that extend in a fore-and-aft direction along the opposite sides of the bed 136 a short distance above the floor 198. Additionally, there are a pair of upright guide rails 250 adjacent the front of the stack-building area 134 that are spaced apart in a transverse direction symmetrically with the center line of the machine. Furthermore, a pair of sidewalls 252 substantially above the normal, layer-forming position of the bed 136 are located on opposite lateral sides of the stack-building area 134 and extend substantially the full fore-and-aft length of the latter, the upper extremity of each of the sidewalls 252 being substantially above the tubes 214 while the lower extremities thereof are only a short distance below such tubes.

As illustrated particularly in FIGS. 13, 14, 15 and 16, the machine may be optionally provided with a feeder 254 for assisting in single bale unloading. Although the feeder 254 is removed from the figures other than FIGS. 13, 14, 15 and 16 for purposes of clarity, it is to be understood that the feeder 254 may be mounted on the chassis 16 via fore-and-aft extending pivot means 256 for swinging movement between a laterally extending horizontal position as illustrated in FIGS. 13, 14, 15 and 16, and an upright, stored position (not illustrated).

When the feeder 254 is in its lowered position as limited by a chain 258, the feeder 254 effectively becomes an extension of the cross conveyor 22 when the barrier 26 is raised upwardly about its pivot 28 into a clearing position for bales traveling along the conveyor 22 and onto the feeder 254. The feeder 254 basically includes a polygonal platform 260 having a pair of bale-transferring chains 262 and 264 disposed in parallel relationship to one another and operable in the same direction of movement as the cross conveyor 22. Transfer chain 262 is substantially longer than transfer chain 264 and originates closer to the termination of the cross conveyor 22, there being a gate 266 located in the short space between the termination of cross conveyor 22 and the beginning of transfer chain 262. While the transfer chains 262 and 264 are constantly operating and have lugs such as 268 that project upwardly beyond the platform 260, the gate 266 is intermittently operable to project up above the platform 260.

In this regard, while both the chains 262, 264 and the gate 266 are driven by the same fore-and-aft extending shaft 270 that is in turn operably coupled with a driven shaft 272 of the conveyor 22 via a chain and sprocket assembly 274, the gate 266 is controlled by a cam 276 which causes the two prongs 278 of the gate 266 to swing alternately up and down through the platform 260. The two prongs 278 have generally horizontally extending portions 278a located beneath the platform 260 and fixed at their inner ends to a sleeve 280 which rotatably receives the shaft 270. The rearmost prong 278 has its horizontal portion 278a extended slightly beyond the sleeve 280 to support a following roller 282 that is engageable with the periphery of cam 276. Torsion springs 284 operating against the prongs 278 yieldably bias the same upwardly through the platform 260 and also serve to maintain the following roller 282 against the cam 276. The cam 276 is fixed to a short fore-and-aft extending stub shaft 286 that in turn carries a sprocket 288 entrained by a chain 290 which is wrapped around a small sprocket 292 on the drive shaft 270.

Figure 43:
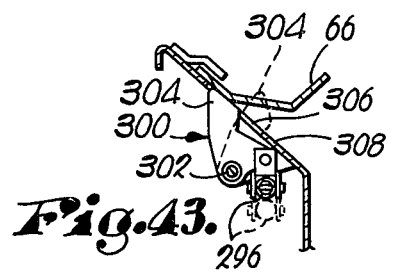
FIG. 43 is a fragmentary elevational view of the lockout assembly taken substantially along line 43—43 of FIG. 42.

FIGS. 42 and 43 disclose an alternative embodiment with respect to the control of the bale pickup 30. While as described with respect to the other figures of the drawings, the pickup 30 operates during each depression of the sensor 54 by a received bale, the embodiment in FIGS. 42 and 43 renders the operation of the pickup 30 dependent upon whether or not the indexing device 60 is in its home position. To this end, lockout mechanism 294 is provided between the indexing device 60 and the dog clutch 50 for enabling the latter to be engaged only when the indexing device 60 is home.

The lockout mechanism 294 includes a generally horizontally extending arm 296 that is swingable about a fore-and-aft pivot 298 on the front side of the conveyor 22 and is gravity-biased to the phantom position illustrated in FIG. 42. At a point spaced from the pivot 298, the arm 296 is pivotally connected to a rocker 300 which can swing in a fore-and-aft direction about a transverse pivot 302. One leg 304 of the rocker 300 can protrude through an opening 306 in a banked guide wall 308 along the forward extremity of the conveyor 22, such protrusion of the leg 304 placing the same into position for operable engagement with the head 66 of the indexing arm 62. The pivotal connection of the arm 296 with the rocker 300 is such that the leg 304 of the latter is biased toward the protruding position illustrated in phantom in FIG. 43, the leg 304 being retracted to its solid line position of FIG. 43 only when the head 66 is in its home position forcing the rocker 300 in a counterclockwise direction against the weight of the arm 296.

The cable 52 between the sensor 54 and the clutch 50 passes through a guide 310 at the outer end of the arm 296 and is anchored to an operating lever 312 which determines whether the clutch 50 is engaged or disengaged. The length of the cable 52 is such that, when the arm 296 is in its lowered, phantom position of FIG. 42, there is slack in the cable 52 as indicated by the slack stretch 52a in FIG. 42. Slack stretch 52a is of sufficient length that even if the sensor 54 of the pickup 30 is depressed by a received bale, the cable 52 is inoperative to swing the lever 312 and engage the clutch 50. Only when the arm 296 is raised as a result of the transfer device 60 being in its home position, is the slack 52a taken out of the cable 52 such that depression of the sensor 54 of pickup 30 will result in operation of the clutch-operating lever 312.

Operation

The operation of the machine and the stack-building method resulting therefrom with respect to the stack 10 will now be summarized with primary reliance upon FIGS. 17–40. Thereafter, certain detailed explanations of the various operations of individual assemblies and mechanisms of the machine will be described.

Figure 18:
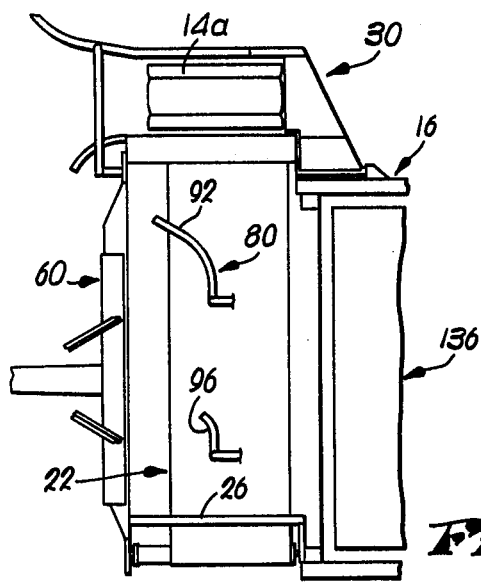
FIGS. 18-22, inclusive, are fragmentary plan views, on a schematic basis, of the front end of the machine illustrating successive steps in the formation of a layer for the stack.

As the machine is advanced along the field, the pickup 30 is in its lowered position as in FIG. 18 for the reception of bales lying on the ground with one of their major faces in ground engagement. The first bale received within the pickup 30 will be a transverse or tie bale in the layer A of the stack 10 in FIG. 17. This bale may be labeled 14a.

Figure 19:
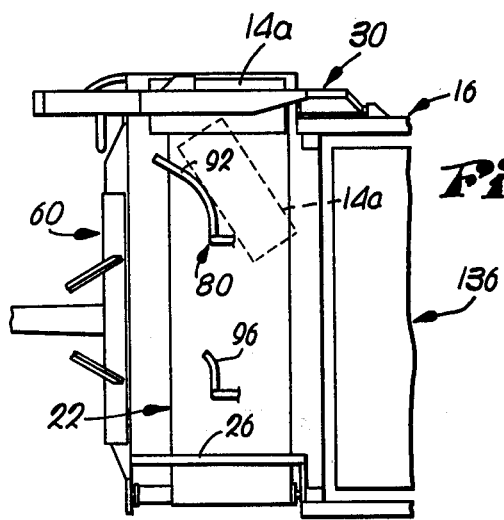
Figure 20:
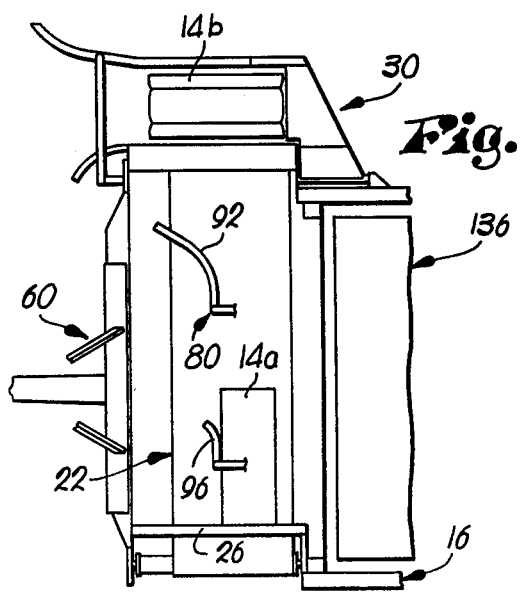

The bale-orienting unit 78 is lowered at this time so that the bale-engaging member 80 thereof is in the path of travel of bales on the conveyor 22. Thus, as the pickup 30 lifts the bale 14a and places it on edge onto the cross conveyor 22 as illustrated in FIG. 19, the convexly curved tip 92 of member 80 is in position to be engaged by the bale 14a as the conveyor 22 moves the latter toward the left side of the machine. Such engagement by the curved tip 92 has the effect of turning the bale 14a as illustrated in phantom in FIG. 19, whereupon the bale 14a travels on across the front of the machine on conveyor 22 until coming to rest against the barrier 26. The other curved tip 96 of the member 80 serves to help control the bale 14a during its movement along the conveyor 22, and also to assist in retaining the same motionless against the barrier 26 while the conveyor 22 slides therebeneath. This is illustrated in FIG. 20.

The second tie bale 14b is subsequently picked up by the pickup 30 and placed on the conveyor 22, whereupon it, too, is turned by the member 80 so that it will come into end-to-end abutment with the bale 14a. The two bales 14a and 14b will thus accumulate into a group, wherein both bales have their longitudinal axes extending transversely of the direction of subsequent displacement of the group into the stack-building area 134.

Figure 21:
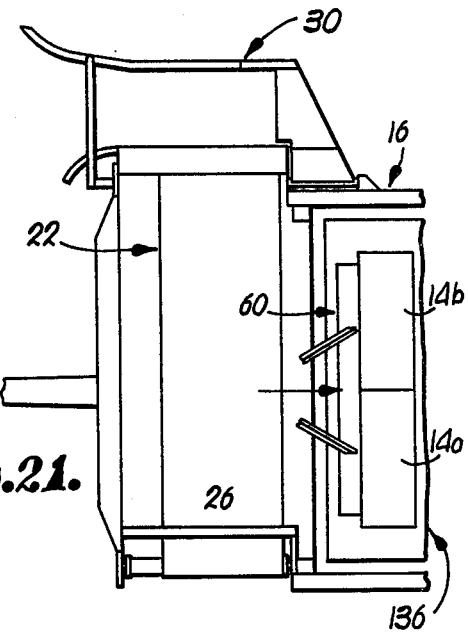
Figure 22:
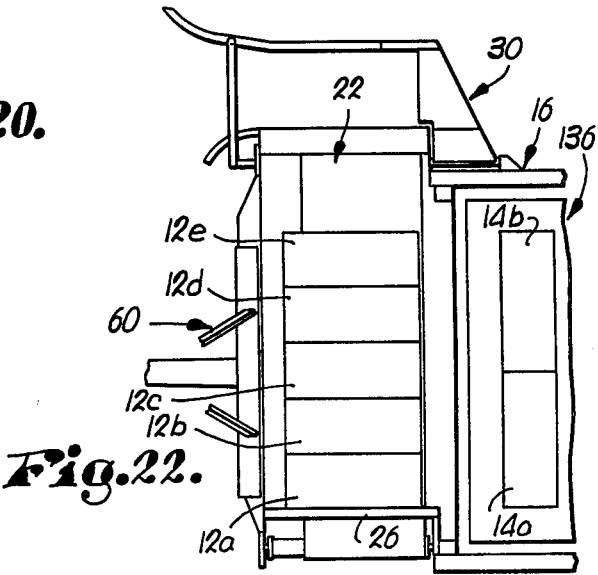
Figure 37:
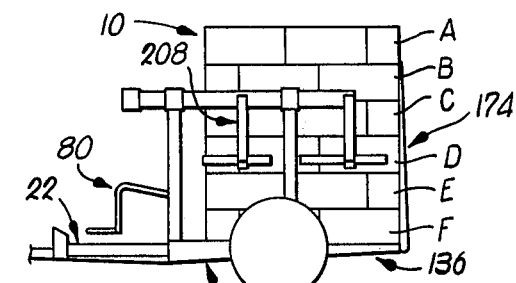
FIG. 37 is a schematic, side elevational view of the machine with a completed stack in place for transport.

When the group of transverse bales 14a and 14b has accumulated against the barrier 26, the operator actuates the indexing device 60 to shove the group of transverse bales 14a and 14b rearwardly off the conveyor 22 and onto the bed 136 as illustrated in FIG. 21. Such actuation of the indexing device 60 also has the effect of raising the bale-orienting unit 78 so that its member 80 is no longer in disposition to engage bales moving along the conveyor 22. Consequently, as illustrated in FIG. 22, the next five bales 12a, 12b, 12c, 12d and 12e placed on the conveyor 22 by pickup 30 accumulate against the barrier 26 with their longitudinal axes extending parallel to the direction of subsequent displacement thereof by the indexing device 60. This group of bales is, of course, the middle group of longitudinal bales 12 in the layer A of stack 10. This group is thereupon indexed rearwardly by the indexing device 60 so that it engages the prior group of transverse bales 14a and 14b and moves them rearwardly toward the endgate 174 in the process. Thereafter, with the bale-orienting unit 78 still raised, the next group of five bales accumulating on the conveyor 22 will also be longitudinal bales and will comprise the third group of layer A after being displaced by the indexing device 60 onto the bed 136. Such final displacement of the third group onto the bed 136 also shoves the two previous groups rearwardly until the transverse bales 14a and 14b engage the endgate 174, this completing the formation of the first layer A as illustrated schematically in FIGS. 23 and 24.

During the formation of layer A, the bed 136 has been disposed at its layer-forming position substantially level with the conveyor 22 and the jaws 208 have been swung inwardly to their layer-retaining positions as illustrated in FIG. 24. Thereupon, the bed 136 is raised directly overhead to a layer-transferring position illustrated in FIG. 25, by which time the jaws 208 have been swung outwardly to their layer-releasing positions of FIG. 26. Actuation of the jaws 208 toward one another then causes the layer A to be clamped by the jaws 208, and further causes the spikes 226 to penetrate the layer to assist in retaining the same. This action is illustrated in FIGS. 27 and 28 where the bed 136 has been returned to its layer-forming position and the spikes 226 of the jaws 208 have penetrated into the layer A. In this regard, note in FIG. 28 that at least certain of the spikes 226 pass entirely through the outermost longitudinal bales and partially into the next-to-the-outermost ones of such bales, leaving only the center longitudinal bale unpenetrated. This naturally assists in retaining the layer A.

With the layer A retained overhead by the jaws 208, there is now room on the lowered bed 136 for the formation of layer B, and this is accomplished in virtually the same manner as in layer A, except that, this time, the two transverse tie bales 14 thereof are added to the layer last instead of first. Thus, as illustrated in FIG. 29, upon the completion of layer B on the bed 136, the transverse tie bales 14 of layer B are at the front of the stack-building area 134 while the transverse tie bales 14 of layer A are at the rear thereof. Both FIGS. 29 and 30 show the fully prepared layer B in readiness for elevation thereof to the jaws 208.

Thereupon, the bed 136 is elevated to an intermediate position below the layer-transferring position thereof to a point where the layer B is brought up against the bottom of layer A in position to support the weight of the latter. When the jaws 208 then retract as illustrated in FIGS. 31 and 32, the layer A will not fall as a result of its underlying support from the layer B and the bed 136.

Following complete retraction of the jaws 208, the bed 136 is further elevated to its layer-transferring position as illustrated in FIGS. 33 and 34, wherein the layer B comes into registration with the jaws 208. Thereupon, actuation of the jaws 208 as illustrated in FIGS. 35 and 36 causes the same to clamp and penetrate the layer B so as to support the same along with the superimposed layer A, permitting the bed 136 to be lowered back down to its layer-forming position.

Figure 38:
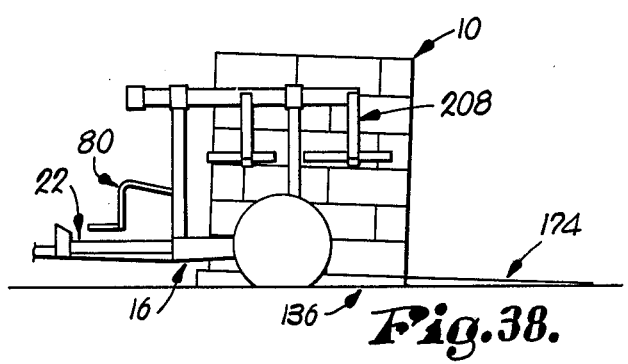
FIG. 38 is a schematic, side elevational view of the machine similar to FIG. 37, but with the bed fully lowered and the endgate swung down to the ground for discharge of the complete stack.

The above process is repeated several times over, depending upon the number of layers desired in the stack, in each case the transverse tie bales 14 ending up at the opposite end of the stack from those of the previously formed layer. When the last layer has been formed (in this case layer F), the layers A through E will all be supported several inches above layer F in the manner depicted in FIGS. 29 and 30 with respect to layers A and B. The layers A, B, C and D, of course, will be supported by layer E which is actually the only layer engaged by the jaws 208. Thereupon, the bed 136 may be elevated to its intermediate position as illustrated in FIGS. 31 and 32 so as to place the weight of layers A through E on layer F and the bed 136, permitting the jaws 208 to be retracted. At that point, the stack may be off-loaded or returned down to the position illustrated in FIG. 37, wherein the bed 136 is at its normal, layer-forming position. Most likely, the stack will be unloaded directly onto the ground, in which event the bed 136 is lowered to its lowermost, ground-engaging position as illustrated in FIG. 38 and the endgate 174 is swung downwardly to the ground as shown in that same figure. Activating the off-loading mechanism 180 causes the slat 196 to move out of its stored position as illustrated in FIG. 8 and into engagement with the front of the stack so as to progressively displace the latter rearwardly out of the stack-building area 134, off the bed 136 and off the endgate 174 as illustrated in FIG. 39.

An alternative off-loading procedure for the stack is also illustrated in FIG. 40, in which the stack is shown being loaded onto the flatbed of a transport vehicle 312. Reversal of the off-loading mechanism 180 returns the slat 196 back to its stored position and also raises the endgate 174 back to its upright position, whereupon the bed 136 may be raised or lowered as desired to bring the same back to its layer-forming position to repeat the above steps in connection with the next stack.

Figure 41:
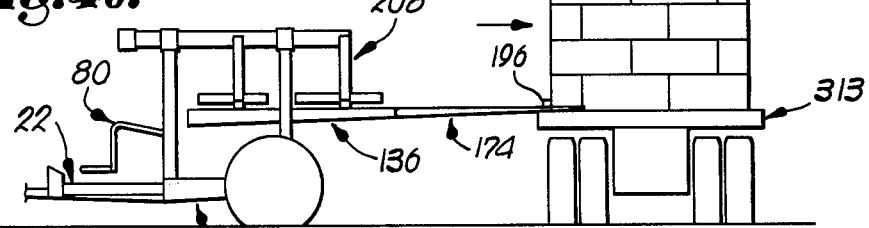
FIG. 41 is a schematic diagram of two hydraulic circuits of the machine, one being used to control operation of the bed and the jaws of the retaining structure, and the other being used to control operation of the off-loading mechanism and the indexing device.

FIG. 41 shows a pair of hydraulic circuits used in connection with carrying out the various operations of the hydraulically operated components of the machine. It is contemplated that the present machine may be connected with a general purpose farm tractor of the type provided with a pair of remote outlets (not shown) for use in controlling the two circuits 314 and 316, the tractor having a pair of selector valves 318 and 320 for the circuits 314 and 316, respectively.

The circuit 314 is used to operate the hydraulic motor 192 associated with the off-loading mechanism 180 and the hydraulic cylinder 74 used in connection with the indexing device 60. When the tractor valve 318 is in the position illustrated in FIG. 41, there is no flow through the circuit 314. However, if the tractor valve 318 is shifted rightwardly so as to bring passage 322 into alignment with line 324 leading to the cylinder 74, this also aligns passage 326 with return line 328 so as to extend the ram of the cylinder 74 when a remotely operated selector valve 330 of the circuit 314 is in the position in which its internal passages 332 and 334 are in communication with the lines 324 and 328. Conversely, when the tractor valve 318 is shifted in the opposite direction to bring its passages 336 and 338 into alignment with the lines 324 and 328, respectively, fluid is pumped to the cylinder 74 in the opposite direction so as to retract its ram.

The foregoing description assumes that the selector valve 330 is set for operation of the indexing device 60. However, the selector valve 330 may be manipulated in such a way that its internal passages 340 and 342, represented by phantom lines as being inoperable when the valve 330 is in its position of FIG. 41, may be brought into communication with lines 344 and 346 leading to and from the hydraulic motor 192 for the off-loading mechanism 180. In that instance, shifting the tractor valve 318 to the right from its neutral position will cause the motor 192 to be operated in a direction to off-load a stack, while shifting the tractor valve 318 to the left will cause the motor 192 to be operated in the opposite direction, causing return of the off-loading mechanism 180 to its stored condition.

The circuit 316 includes a pair of lines 348 and 350 controlled by the tractor valve 320. A selector valve 352 across the lines 348 and 350 may be manipulated in such a way as to either open or close communication between the lines 348, 350 and another pair of lines 354 and 356 on the opposite side of the valve 352, the latter being shown in a position communicating the lines 348, 350, 354 and 356 with one another in FIG. 41. Line 354 leads to one end of the rectilinear double-acting hydraulic motor 240 which controls operation of the jaws 208, the line 356 leading from the opposite end thereof and having a control valve 358 interposed therein which either opens or closes the line 356 depending upon the vertical position of the bed 136. In this regard, the bed 136 carries a cam 360 (see also FIG. 2) that mechanically operates the valve 358 so as to maintain the latter closed when the bed 136 is at its layer-forming position, but to maintain the same open at or above the intermediate position of the bed 136 as illustrated in FIGS. 31 and 32. A check valve 362 in line 350 prevents flow in the latter from line 356 unless pressure in line 348 has reached a certain predetermined level, in which event a pilot line 364 communicating line 348 with the check valve 362 is operable to unseat the latter and permit flow in either direction in the line 350.

The circuit 316 also includes another part which is operable to control the rectilinear hydraulic motors 144 which raise and lower the bed 136. A line 366 from line 348 leads to the cylinder end of one of the motors 144, and a line 368 leads from the rod end of that cylinder 144 to the cylinder end of the other motor 144. In turn, a line 370 leads from the rod end of said other motor 144 to the line 350. A check valve 372 in line 366 prevents flow in the latter from the corresponding motor 144, unless a certain predetermined pressure level has first been reached in the line 370, in which event a pilot line 374 leading from the line 370 to the check valve 372 unseats the latter and permits flow in either direction through the line 366. A sequence valve 376 across the line 370 is operable to permit flow through itself only in one direction (as indicated by the arrow 378), and even then only after a predetermined pressure level has been reached in the line 370 on the tractor side of the sequencing valve 376. A check valve 380 disposed in parallel fluid flow relationship with the sequencing valve 376 permits flow in the line 370 from the motor 144 and into the line 350, effectively thus serving as a one-way bypass around the sequencing valve 376.

Assuming now that the bed 136 is in its layer-forming position with the tractor valve 320 maintained in its neutral position as illustrated in FIG. 41, the cam 360 on the bed 136 will have the control valve 358 maintained closed. Thus, a first operating path 388 defined by line 348, selector valve 352, line 354, motor 240, control valve 358, line 356, pilot check valve 362 and line 350 will be defined. When the tractor valve 320 is shifted rightwardly from its FIG. 41 position to bring its internal passages 382 and 384 into communication with the lines 348 and 350, respectively, high pressure fluid is pumped into operating path 388 in the direction of the arrow 386. However, since the control valve 358 is closed by the cam 360, this effectively closes the path 388 and prevents actuation of the jaw motor 240. Inasmuch as the second operating path 390 defined by the line 348, line 366, check valve 372, motor 144, line 368, motor 144, line 370, check valve 380 and line 350 is in parallel flow relationship to the first operating path 388, pressurized fluid in the direction of the arrow 393 flows through the second operating path 390 to extend both bed motors 144 and hence raise the bed 136.

The bed 136 rises to its intermediate position of FIGS. 31 and 32 at which point the cam 360 releases the control valve 358 of the first operating path 388 so as to open the latter. Inasmuch as the effort required to raise the bed 136, particularly with a layer of bales thereon, is greater than that required to extend the jaw motor 240 and thereby retract the jaws 208, raising of the bed 136 is temporarily halted while pressurized fluid flows through the first operating path 388 in the direction of the arrow 392. Note that fluid can return to the line 350 out of the rod end of the jaw motor 240 because of the fact that the check valve 362 is unseated by high pressure fluid in pilot line 364 at this time. On the other hand, the bed 136 is held against dropping from its intermediate position by the check valve 372 in the second operating path 390, there being insufficient pressure in line 370 at this time and in pilot line 374 to unseat the check valve 372.

When the jaw motor 240 reaches full extension and can go no further, fluid flow diverts back to the second operating path 390 to resume operation of the bed motors 144 in the direction of the arrow 393 to raise the bed 136 up to its layer-transferring position as illustrated, for example, in FIGS. 25 and 26. Although this is not at the end of the strokes of the bed motors 144, because the lower limiting abutments 158 on the bed 136 have come up against the positive limit stops 160 on the uprights 132, a relief valve (not shown) in the tractor hydraulic system will automatically open if the operator does not throw the tractor valve 320 back to its neutral position at precisely the proper time. In this way, the layer-transferring position of the bed 136 is rendered precisely the same time after time.

If the operator then throws the tractor valve 320 leftwardly from its position in FIG. 41, its internal passages 394 and 396 will be brought into communication with the lines 348 and 350, respectively, so as to reverse the flow in said lines in the direction of the phantom arrows 398 and 400, respectively. While this pressurizes both operating paths 388 and 390 in the reverse direction from the arrows 392 and 393 as illustrated by the phantom arrows 402 and 404, respectively, the sequence valve 376 of path 390 is set to preclude flow through the line 370 in the direction of arrow 404 unless the pressure reaches a certain predetermined level. Such level is selected at a point that is greater than the pressure required to operate the jaw motor 240, and thus, since the control valve 358 remains open, pressurized flow will take place in the operating path 388 in the direction of the arrow 402 so as to swing the jaws 208 into retaining engagement with the aligned layer on the bed 136.

As the spikes 226 of the jaws 208 enter the bale layer and the structural channels 228 come into clamping engagement with the lateral sides of the layer, the pressure within the operating paths 388 and 390 rises until, when the jaws 208 have firmly gripped the layer, the limit pressure of the sequence valve 376 is reached so that the latter opens operating path 390 and allows flow therethrough in the direction of the arrow 404. This operates the bed motors 144 in a direction to lower the bed 136. Note that during such lowering of the bed 136, operating pressure continues to be applied against the jaw motor 240 in the direction of the arrow 402. Consequently, if the layer should compress laterally under the influence of the jaws 208 while the bed 136 is lowering, the jaws 208 will be operable to take up such compression and swing further inwardly to the extent necessary. When the bed 136 reaches a point just below its intermediate level, however, the cam 360 closes control valve 358 so as to effectively close the operating path 388 so that the jaws 208 can no longer be operated at the line pressure in the other operating path 390. The bed 136 continues to lower until the upper limiting abutments 156 on the bed 136 come down against the positive limiting stops 160 on the uprights 132, whereupon the tractor relief valve either opens automatically or the operator shifts the tractor valve 320 in a direction to return the same to the neutral position of FIG. 41.

It should be noted that while the check valve 372 in operating path 390 is operable to hold the bed 136 against retrograde downward movement during those times that such movement is not desired, by the same token it can be and is opened when flow in the line 370 is in the direction of arrow 404 and the pressure is above the minimum level permitted by the sequence valve 376. This is due to the fact that the pilot line 374 transfers the operating pressure of line 370 to the check valve 372 and unseats the same so as to allow flow out of the bed motors 144 along line 366. Similarly, check valve 362 of operating path 388 holds the jaw motor 240 against retrograde movement in a direction that would open the jaws 208 when the same are clamped against a bale layer and such opening is not desired. On the other hand, when the jaws 208 must be opened to release the layer, check valve 362 is overcome by positive pressure in line 348 which is transmitted to the valve 362 by pilot line 364, hence permitting fluid flow out of the jaw motor 240 along line 356.

It should also be pointed out that there are times when it is desirable to operate the bed 136 without having any automatic sequencing operation of the jaws 208 as above-described. In that situation, with the jaws 208 open and fully retracted, the selector valve 352 across the operating path 388 may be manipulated in a direction to close the entire path 388, such a position of the selector valve 352 being represented by the phantom lines on that valve. Consequently, no fluid flow will occur in the operating path 388 under those circumstances and the bed 136 may be raised and lowered as desired. This is of particular benefit where the machine is being used to transport a stack, under which circumstances it is desirable that the jaws 208 be disengaged therefrom so that the entire weight of the stack is carried by the bed 136. Lowering the bed 136 to the ground and off-loading the stack as illustrated in FIG. 39, or raising the bed 136 to the height of a transporting vehicle as illustrated in FIG. 40 and off-loading the stack onto such vehicle are additional examples of instances when the jaws 208 should be kept fully retracted.

It is contemplated that the present machine can be utilized to retrieve stacks which it fabricates as well as to off-load the same for storage. In this connection, although not illustrated in the drawings, it is to be understood that a suitable drag chain may be looped around the bottom layer of a stack resting on the ground or other supporting surface with opposite ends of the chain thereupon connected to opposite ends of the slat 196 of the off-loading mechanism 180 when slat 196 has been run down to the tip of the endgate 174 and the latter is lowered. By then reversing the hydraulic motor 192, the stack may be progressively drawn onto the endgate 174 by the slat 196 and the attached drag chain, until such time as the slat 196 is returned to its stored position as illustrated in FIG. 8, at which time the drag chain may be removed inasmuch as the stack will be fully inside the stack-building area 134 on the bed 136. Thereafter, the stack may be transported to a different location and off-loaded in the usual manner.

Any stack within the machine may be unloaded a single bale at a time if such is desired, rather than off-loading the entire stack in a bodily manner. Assuming such single bale unloading to be desired, and assuming further that the stack is resting on the bed 136 with the latter in its layer-forming position, it is first necessary to elevate the bed 136 until the bottom layer of the stack comes into alignment with the jaws 208, whereupon their actuation to engage and penetrate the lower layer of the stack results in the entire stack being retained above the layer-forming position of the bed. When the bed 136 is thereupon lowered back down to its layer-forming position, the off-loading mechanism 180 is actuated in a direction to run the slat 196 rearwardly at least to the beginning of the endgate 174 which will be lowered at this time as a result of the cables 200 being paid out by rearward movement of the slat 196. Ideally, the hooks 202 associated with the cables 200 are rotated ninety degrees or are otherwise thereupon manipulated so as to be out of a position to engage the slat 196 upon its return movement, such a condition being illustrated, for example, by the phantom line position of the hook 202 in FIG. 9. Consequently, when the slat 196 is run forwardly during the single bale unloading operation, the endgate 174 may remain lowered because the hooks 202 will not be engaged by the slat 196.

The bed 136 is thereupon raised to its layer-transferring position in engagement with the bottom layer of the stack. The jaws 208 may then be retracted, allowing the bed 136 to be lowered to a point in which the next-to-the-bottom layer is brought into alignment with the jaws 208. Jaws 208 are then inserted into the next-to-the-bottom layer, permitting the bed 136 to be lowered to its layer-forming position with only the bottom layer. This condition of things is illustrated in FIG. 13. The feeder 254 is lowered at this time, the conveyor 22 is operating in its normal direction toward the feeder 254, and the barrier 26 is raised or otherwise removed out of the path of travel of bales along the conveyor 22. The bale-orienting unit 78 is also raised.

The off-loading mechanism 180 is then actuated to bring the slat 196 against the rearmost end of the layer, and continued operation of the off-loading mechanism 180 in its reverse direction causes the slat 196 to deliver the forwardmost group of bales onto the conveyor 22. Conveyor 22 thereupon may be actuated to convey the group to the feeder 254, the intermittently operating gate 266 serving to stop and then release the leading bale of the group to the transfer chains 262 and 264 of feeder 254. If the particular group of bales consists of longitudinal bales such as the bales 12 of the stack 10, such bales will be turned ninety degrees by the action of the long transfer chain 262 in cooperation with a convexly curved guide 406 on the platform 260. As the rear end of a longitudinal bale 12 is engaged by the transfer chain 262 and fed in an outboard direction, the front end of such bale is retarded by the guide 406 such that the rear end of the bale swings around until it becomes essentially lined up with the path of travel of the transfer chains 262 and 264, which then cooperate to deliver the bale further outboard to additional conveying or elevating structure as may be desired. Note that transversely extending tie bales such as the bales 14 of the stack 10 are already in proper alignment for the single bale off-loading and thus will not be turned by the transfer chain 262 and the guide 406.

After the first group of bales has been cleared from the conveyor 22, the slat 196 may be actuated further forwardly to successively deliver the second and third groups of bales onto the conveyor 22 for manipulation in the same manner as above-described. When the bed 136 is thus entirely cleared of the layer, the slat 196 may be run back to the rear of the bed 136, whereupon the latter may be raised to obtain another layer from the jaws 208. The sequence is then repeated until the stack has been fully depleted if such is desired. Thereupon, the hooks 202 are returned to their solid line positions as illustrated in FIG. 9, so that, when the slat 196 is run forwardly toward its stored position of FIG. 8, the hooks 202 will be engaged thereby and the endgate 174 will be raised.

Returning now to certain details of operation of the machine, it is important to note that while actuation of the indexing device 60 is preferably a manual rather than automatic step, e.g., the operator throws the tractor valve 318 in the proper direction only after he observes that a full group of bales has been accumulated on the conveyor 22, the operator need not keep track of when it is time for a transverse, tie bale or when it is time for longitudinal bales to be added to the layer. This function is automatically performed by the control means 104 as a function of operation of the indexing device 60.

Figure 5:
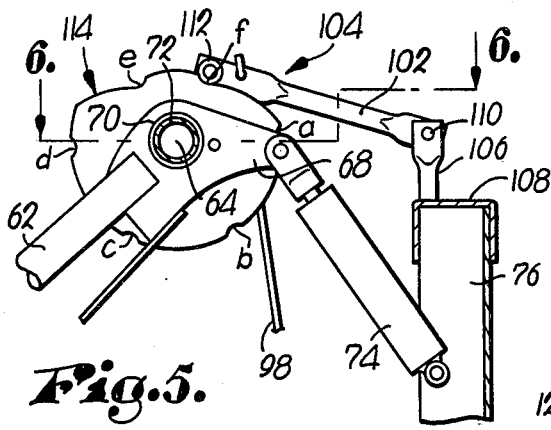
FIG. 5 is an enlarged, fragmentary vertical cross-sectional view substantially along the fore-and-aft longitudinal axis of the machine and illustrating a portion of the indexing device.
Figure 6:
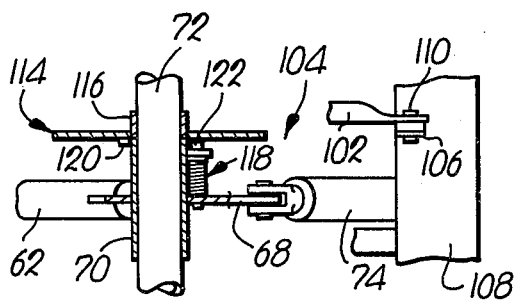
FIG. 6 is a fragmentary, cross-sectional view thereof taken along line 6—6 of FIG. 5.
Figure 7A:
FIG. 7A is an enlarged, fragmentary detail view of the ratchet associated with the cam and indexing arm.

Assuming, for example, that the following roller 112 is in notch f of the cam 114 as illustrated in FIG. 5, the bale turning member 80 will be down into its lowered position so that, during this interval between actuations of the indexing device 60, two tie bales such as the tie bales 14a and 14b of layer A will be arranged on the conveyor 22. During the actuation of the indexing device 60 to shove the tie bales 14a and 14b off the conveyor 22 and onto the bed 136, the ratchet 118 rotates the cam 114 through a sixty degree increment of travel in a counterclockwise direction viewing FIG. 5, such that the following roller 112 traverses stretch f-a. Stretch f-a causes the follower lever 102 to lift the turning member 80 out of bale turning disposition so that, during the next interval between actuations of the indexing device 60, the following roller 112 resides in notch a and the bales delivered onto the conveyor 22 by the pickup 30 accumulate into a group of longitudinal bales such as the middle group of the bales 12 in layer A.

During the next actuation of device 60 to index the longitudinal bales rearwardly onto the bed 136, the cam 114 rotates sixty degrees counterclockwise to bring the notch b under the follower 112. Inasmuch as the notch b is the same distance from the axis 64 as the notch a, the bale turning member 80 remains raised so that another group of longitudinal bales 12 is accumulated on the conveyor 22 during the next interval between actuations of the indexing device 60.

The bale turning member 80 remains raised during the next two intervals between actuations of the indexing device 60 because notches c and d of the cam 114 are likewise spaced from the axis 64 the same distance as notches a and b. Thus, the bale turning member 80 is raised for a total of four intervals between operations of the indexing device 60, this resulting in the two groups of longitudinal bales 12 of layer A followed by the first two groups of longitudinal bales 12 in layer B. During actuation of the indexing device 60 following the interval represented by notch d, the turning device 80 is lowered as the follower 112 moves into notch e, which is radially spaced from the axis 64 the same as the notch f. Hence, the final group of bales for the layer B becomes a group of transverse tie bales 14, whereupon, during operation of the indexing device 60 for such final group, the follower 112 moves into the notch f so that conditions are set for a repeat of the above-described sequence with respect to the remaining layers of the stack.

With particular reference now to FIG. 10, it is important to note the manner in which each of the spike assemblies 220 for the jaws 208 functions during entry of the spikes 226 into a layer of bales. In this regard, although each of the jaw arms 212 swings about a fore-and-aft, horizontal axis 210 and thus has its lower tip moving in an arcuate path of travel, the fact that the spike assemblies 220 can swing about the axes 224 as the spikes 226 enter the bale layer means that the spikes 226 can enter the layers substantially horizontally as illustrated in phantom lines in FIG. 10. The upper limit shoulders 230 on rods 234 engage the lugs 236 when the spikes 226 have swung down to a substantially horizontal position as the arms 212 push the spikes 226 into the bale layer and the arms 212 swing inwardly. Upon retraction of the arms 212, the return springs 238 pull the spikes 226 back up to the limit provided by the shoulders 232 engaging the bottom of the lugs 236. Preferably, the spikes 226 engage the bales between the strings wrapped around the bales and a short distance above the center of the bales.

It is significant also to note that the design of the present machine permits stored stacks of various heights to be achieved. That is, in view of the fact that the finished stack can be off-loaded from the machine at any number of selected vertical positions, one finished stack may be placed on top of another, shorter stack if so desired so that the resulting stored stack has more than six layers of bales. Likewise, stacks having more than six layers can be retrieved by the machine simply by lowering the bed 136 all the way to the ground and then picking up the stack in the usual manner. If desired, only part of a stack may be retrieved by simply placing the bed 136 at a selected height above the ground and then driving the tines 176 of the endgate 174 into the stack beneath the appropriate layer. Retrieval is then simply continued in the usual manner.

A stack constructed in the manner of the stack 10 in FIG. 17 is ideally suited for maximum utilization of the available payload space on many flatbed tractor trailer rigs under most, if not all, state highway regulations. For example, if each bale of the stack 10 has dimensions of approximately 14 inches by 18 inches by 38 inches, the resulting stack 10 will consist of 72 bales and will have dimensions of approximately 6 feet by 8 feet by 9 feet. If the stack is loaded onto the vehicle in the manner illustrated in FIG. 40 in which the 8-foot dimension extends across the vehicle, this will occupy substantially all the available width of the vehicle. The 9-foot height of the stack coupled with the approximate 4-foot, 6-inch height of the trailer of the vehicle combines to a total height of 13 and one half feet. Several of the stacks may be placed in a fore-and-aft series along the bed to the extent permitted by the 6-foot dimension of each of the stacks.

We claim:

1. In a mobile machine for building a multilayer stack of crop bales, the improvement comprising:
   a generally horizontally disposed bed supported above the ground for travel across a field having a number of bales lying thereon;
   apparatus for picking up said bales, elevating the same to said bed, and forming one layer at a time on the bed from the picked up and elevated bales;
   means for vertically reciprocating said bed between, and selectively holding the same at, any one of a number of vertical positions including a layer-forming position and an overhead, layer-transferring position;
   structure for successively receiving layers from said bed in said layer-transferring position of the latter and for retaining the same, together with any layers above the retained layer, in spaced disposition above the bed so as to progressively form an upright stack from the bottom up from the layers presented by the bed,
   said structure including selectively releasable means operable when released to permit retrograde, lowering movement of layers with the bed; and
   mechanism for off-loading a completed stack from said bed while said stack remains upright and while the bed remains substantially horizontal within its path of vertical, reciprocating travel.

2. In a mobile machine as claimed in claim 1, wherein said apparatus includes means for orienting certain bales of each layer transverse to the other bales of the same layer.

3. In a mobile machine as claimed in claim 2, wherein said certain bales comprise a pair of end-to-end bales along one side of the layer, said transverse bales of adjacent layers in the stack being at alternately opposite sides of the stack.

4. In a mobile machine as claimed in claim 1, wherein said apparatus includes:
   a conveyor disposed substantially level with and alongside of the bed when the latter is at said layer-forming position;
   means for picking up and placing bales on said conveyor;
   means for accumulating a group of side-by-side bales on the conveyor having their longitudinal axes extending in a fore-and-aft direction relative to the direction of their subsequent transfer onto said bed;
   an indexing device operable to effect said transfer of the group off said conveyor and onto said bed; and
   a unit operable with respect to certain of the bales placed on said conveyor to orient the same with their longitudinal axes transverse to said fore-and-aft direction,
   said accumulating means being operable to accumulate a preselected number of said transverse bales in end-to-end relationship on said conveyor,
   said indexing device being operable to shift the transverse bales off the conveyor and onto said bed for inclusion in a layer along with a preselected number of said groups of fore-and-aft bales.

5. In a mobile machine as claimed in claim 4, wherein said preselected number of transverse bales comprises a pair of said bales.

6. In a mobile machine as claimed in claim 5, wherein said preselected number of said groups of bales comprises a pair of said groups, each group having five fore-and-aft bales therein.

7. In a mobile machine as claimed in claim 4, wherein said conveyor extends across the front of said bed with respect to the normal path of travel of the machine.

8. In a mobile machine as claimed in claim 4, wherein said unit includes means for turning the bales while the same are being moved by said conveyor.

9. In a mobile machine as claimed in claim 8, wherein said unit includes a member shiftable into and out of the path of travel of the bales along the conveyor; and control means between said member and said indexing device for rendering said shifting of the member responsive to a predetermined number of operations of said indexing device.

10. In a mobile machine as claimed in claim 9, wherein said control means includes a cam movable through one predetermined increment of travel during each operation of said indexing device, said control means further including a follower connected with said member and engageable with said cam for causing said shifting of the member during certain of said increments of travel of the cam.

11. In a mobile machine as claimed in claim 10, wherein said cam is mounted for rotation about a certain axis for accomplishing said travel thereof and said indexing device includes an arm movable in a back-and-forth stroke during its operation, said control means further including a ratchet assembly between said arm and the cam for driving the cam in one direction only about said axis and only during one half of each stroke of the arm.

12. In a mobile machine as claimed in claim 11, wherein said arm of the indexing device is mounted for swingable oscillation about said axis of the cam, thereby providing for said back-and-forth stroke.

13. In a mobile machine as claimed in claim 11, wherein said indexing device further includes fluid-pressure power means for driving said arm of the indexing device through its stroke.

14. In a mobile machine as claimed in claim 10, wherein said cam is mounted for rotation about a certain axis for accomplishing said travel thereof, said follower being yieldably biased against the cam by the weight of said member such that said shifting of the member into said path of travel of the bales is gravity-influenced and said shifting of the member out of said path of travel is by the cam overcoming said influence of gravity.

15. In a mobile machine as claimed in claim 10, wherein said cam is configured for maintaining said member out of said path of travel during four consecutive intervals between successive operations of said indexing device and is configured for maintaining the member within said path of travel during two consecutive intervals between successive operations of the indexing device following each set of said four consecutive intervals.

16. In a mobile machine as claimed in claim 15, wherein said cam is mounted for rotation about a certain axis for accomplishing said travel thereof and has a series of six consecutive follower-controlling stretches extending circumferentially about the periphery thereof in correspondence with the six consecutive intervals between operations of said indexing device.

17. In a mobile machine as claimed in claim 1, wherein said structure includes a pair of cooperating jaws on opposite sides of the bed and movable toward and away from one another between layer-retaining and layer-releasing positions.

18. In a mobile machine as claimed in claim 1, wherein said bed is provided with a normally upright endgate rising from one end of the bed and against which each layer may be formed, said endgate being swingable to a lowered, substantially horizontal position extending outwardly from the bed as a continuation thereof for off-loading of a stack.

19. In a mobile machine as claimed in claim 18, wherein said mechanism includes conveyor means engageable with a stack on the bed for displacing the stack along the bed and the lowered endgate and thence off the same.

20. In a mobile machine as claimed in claim 19, wherein said conveyor means is reversible for loading a stack onto the bed via said endgate when the latter is in its lowered position.

21. In a mobile machine as claimed in claim 1, wherein said apparatus includes a conveyor disposed substantially level with the bed when the latter is in said layer-forming position; an actuatable pickup for lifting a bale off the ground and placing the same on said conveyor; means for accumulating a group of bales on the conveyor; an indexing device for intermittently transferring a group of accumulated bales off the conveyor and onto the bed, said pickup including means for actuating the pickup in response to the latter receiving a ground-engaging bale, said pickup and said indexing device having lockout means therebetween for precluding said actuation of the pickup during operation of said indexing device.

22. In a mobile machine as claimed in claim 1, wherein said structure includes a pair of jaws and a fluid-pressure-operated jaw motor for shifting said jaws toward and away from one another, said bed having a fluid-pressure-operated bed motor connected thereto for driving the bed between its various vertical positions, said motors forming part of a fluid-pressure circuit operable to automatically sequence operation of the bed and the jaws during transfer of a layer from the bed to the jaws and return of the bed to the layer-forming position thereof.

23. In a mobile machine as claimed in claim 1, wherein said means for reciprocating and holding the bed is operable to lower the bed to a ground-level position, said off-loading mechanism being operable to off-load the stack when said bed is at its ground-level position or at any selected one of said number of vertical positions thereabove.

24. In a mobile machine for building a multilayer stack of crop bales, the improvement comprising:
 a generally horizontally disposed bed supported above the ground for travel across a field having a number of bales lying thereon;
 apparatus for picking up said bales, elevating the same to said bed, and forming one layer at a time on the bed from the picked up and elevated bales;
 means for vertically reciprocating said bed between, and selectively holding the same at, any one of a number of vertical positions including a layer-forming position and an overhead, layer-transferring position; and
 structure for successively receiving layers from said bed in said layer-transferring position of the latter and for retaining the same, together with any layers above the retained layer, in spaced disposition above the bed so as to progressively form an upright stack from the bottom up from the layers presented by the bed,
 said structure being selectively operable to release its supported layers to said bed when the latter is in said layer-transferring position,
 said structure including a pair of cooperating jaws on opposite sides of the bed and movable toward and away from one another between layer-retaining and layer-releasing positions,
 said jaws being provided with spikes for penetrating bales of the retained layer, at least a certain spike of each jaw being of sufficient length to penetrate multiple ones of the bales disposed along the longitudinal axis of the spike in the retained layer.

25. In a mobile machine as claimed in claim 24, wherein said movement of the jaws toward and away from one another is swingable in nature, each jaw including a support arm swingable about a horizontal axis and having said spike at the outer end thereof, each spike being yieldably pivotally attached to its arm in a transversely extending direction for penetrating the bales substantially horizontally notwithstanding said swinging movement of the arms.

26. In a mobile machine for building a multilayer stack of crop bales, the improvement comprising:
 a generally horizontally disposed bed supported above the ground for travel across a field having a number of bales lying thereon;
 means for vertically reciprocating said bed between, and selectively holding the same at, any one of a number of vertical positions including a bale layer-forming position and an overhead, bale layer-transferring position;
 structure for successively receiving layers from said bed in said layer-transferring position of the latter and for retaining the same, together with any layers above the retained layer, in spaced disposition above the bed so as to progressively form an upright stack from the bottom up from the layers presented by the bed,
 said structure being selectively operable to release its support layers to said bed when the latter is in said layer-transferring position;
 a conveyor disposed substantially level with and alongside of the bed when the latter is at said layer-forming position;
 means for picking up and placing bales on said conveyor;
 means for accumulating a group of side-by-side bales on the conveyor having their longitudinal axes extending in a fore-and-aft direction relative to the direction of their subsequent transfer onto said bed;
 an indexing device operable to effect said transfer of the group off said conveyor and onto said bed; and
 a unit operable with respect to certain of the bales placed on said conveyor to orient the same with their longitudinal axes transverse to said fore-and-aft direction,
 said accumulating means being operable to accumulate a selected number of said transverse bales in end-to-end relationship on said conveyor, said indexing device being operable to shift the transverse bales off the conveyor and onto said bed for inclusion in a layer along with a preselected number of said groups of fore-and-aft bales,
 said accumulating means including a barrier at the end of the conveyor remote from said pickup means in position to retain bales against further conveyance by said conveyor, said barrier being selectively removable from said retaining position for use of the conveyor in connection with unloading bales seriatim for a stack in the machine.

27. In a mobile machine as claimed in claim 26, wherein said mechanism includes reversible conveying means disposed, when operated in one direction, for off-loading a stack from the bed and further disposed, when operated in the opposite direction, for delivering a layer of bales from the bed to said conveyor for said seriatim unloading.

28. In a mobile machine as claimed in claim 27; and a feeder mounted in position to receive bales from said conveyor and direct the same away from the machine, said feeder including endless transfer means for separating the leading bale on the conveyor from those trailing the leading bale.

29. In a mobile machine as claimed in claim 28; a gate between said conveyor and the transfer means in position to temporarily stop the leading bale from being fed by said transfer means; and means for opening said gate at predetermined intervals so coordinated with the speed of the conveyor that only the single leading bale is released to the transfer means during each said opening of the gate.

30. In a mobile machine for building a multilayer stack of crop bales, the improvement comprising:

a generally horizontally disposed bed supported above the ground for travel across a field having a number of bales lying thereon;

apparatus for picking up said bales, elevating the same to said bed, and forming one layer at a time on the bed from the picked up and elevated bales;

means for vertically reciprocating said bed between, and selectively holding the same at, any one of a number of vertical positions including a layer-forming position and an overhead, layer-transferring position; and structure for successively receiving layers from said bed in said layer-transferring position of the latter and for retaining the same, together with any layers above the retained layer, in spaced disposition above the bed so as to progressively form an upright stack from the bottom up from the layers presented by the bed, said structure being selectively operable to release its supported layers to said bed when the latter is in said layer-transferring position, said structure including a pair of jaws and a fluid-pressure-operated jaw motor for shifting said jaws toward and away from one another, said bed having a fluid-pressure-operated bed motor connected thereto for driving the bed between its various vertical positions, said motors forming part of a fluid-pressure circuit operable to automatically sequence operation of the bed and the jaws during transfer of a layer from the bed to the jaws and return of the bed to the layer-forming position thereof, said circuit including:
a bed-operating path connected to said bed motor;
a jaw-operating path connected to said jaw motor,
said paths being connected in parallel fluid flow relationship for concurrent pressurization;
a control valve operable to close said jaw path until the bed reaches an intermediate position below said layer-transferring position in which intermediate position a layer on the bed may engage the bottom of a layer retained by the jaws,
the opening of said control valve rendering said jaw path less resistant to fluid flow than said bed path whereby the jaw motor is operated until the jaws reach their physical limits of separation,
said reaching of their physical limits of separation by the jaws rendering said bed path less resistant to fluid flow than the jaw path whereby the bed motor is operated until the bed reaches a physical limit at said layer-transferring position.

31. In a mobile machine as claimed in claim 30, wherein said circuit further includes:
a sequencing valve in said bed path operable when flow is in the reverse direction through said paths to prevent reverse operation of the bed motor for lowering of the bed to said layer-forming position until the pressure in said paths reaches a certain predetermined level,
said control valve being open when the bed is above said intermediate position such that, when flow is in said reverse direction through the jaw path, the jaw motor is operated reversely to move said jaws toward one another into retaining engagement with the layer aligned with the jaws, thereby raising the pressure in said path to said predetermined level required to thereupon lower the bed.

32. In a mobile machine as claimed in claim 31, wherein said circuit further includes a pilot-operated check valve in each of said paths, respectively, said check valve in the bed path being disposed to hold the bed against lowering, except when overcome by pilot pressure caused by fluid flow in said reverse direction through said bed path, said check valve in said jaw path being disposed to hold the jaws against separation, except when overcome by pilot pressure caused by fluid flow in said first direction through said jaw path.

33. In a mobile machine as claimed in claim 31, wherein said sequencing valve is operable to permit flow therethrough only in said reverse direction, said circuit further including a check valve coupled in parallel flow relationship with said sequencing valve and operable to permit flow only in said first direction, thereby affording a bypass around the sequencing valve for flow in said first direction.

34. In a mobile machine as claimed in claim 31, wherein said circuit further includes a selector valve in said jaw path operable when shifted to a closed position thereof to render said jaws inoperable regardless of whether the control valve is open or closed.

35. In a mobile machine as claimed in claim 30, wherein said bed is provided with a cam for operating said control valve during raising and lowering of the bed.

36. In a method of building a multilayer stack from a number of bales lying on the ground, the improvement comprising:
picking up bales from the ground and forming the same into a first horizontal layer at one elevation;
bodily raising said first layer directly overhead to a second elevation sufficiently spaced above said first elevation to avoid interfering with the subsequent formation of a second layer at said one elevation;
retaining said first layer at said second elevation while a second layer is formed at said one elevation from picked up bales;
bodily raising said second layer directly overhead to said second elevation and concurrently using said second layer to push the first layer upwardly beyond said second elevation a sufficient extent to provide room for the second layer at said second elevation;
retaining said second layer at said second elevation and using said retention of the second layer to support and retain the first layer thereabove;
repeating said picking up, bodily raising and retaining steps with respect to a selected number of additional layers so as to progressively build an upright stack from the layers;
after forming the last layer of the stack at said one elevation, bodily raising said last layer directly overhead until said last layer is in position to support all layers located thereabove; and
after supporting all layers above the last layer with said last layer, bodily displacing the stack horizontally out of the area in which the stack has been built and while the stack remains upright.

37. In a method as claimed in claim 36, wherein said step of bodily displacing the stack out of the stack-building area is carried out at ground-level or at any selected one of a number of elevations thereabove.

38. In a method ac claimed in claim 36, wherein said forming steps include, with respect to each layer, placing a pair of bales in end-to-end relationship along one side of the layer and in transverse relationship to the remaining bales of the layer.

39. In a method as claimed in claim 38, wherein said step of placing transverse bales is carried out at intervals selected to provide said transverse bales of each layer at the opposite side of the stack from the transverse bales of the next adjacent layers.

40. In a method as claimed in claim 36, wherein each forming step includes:
conveying bales along a path of travel at said one elevation with their longitudinal axes extending longitudinally with respect to the direction of their subsequent transfer out of said path of travel;
accumulating said longitudinally extending bales into one group on said path of travel;
effecting said transfer of the one group out of said path of travel to a location adjacent said path of travel;
repeating said conveying, accumulating and effecting steps with respect to a second group of longitudinally extending bales so that the two groups are adjacent one another at said location;
carrying out said conveying and accumulating steps with respect to a third group of bales, but while the same are moving along said path of travel, turning the bales so that they are disposed end-to-end with their longitudinal axes transverse to the direction of their subsequent transfer out of said path of travel,
said bales of the third group remaining in said transverse orientation during the accumulating step; and
effecting said transfer of the third group out of said path of travel to said location.

41. In a method as claimed in claim 40, wherein, with respect to certain alternating layers, said steps of conveying, turning, accumulating and transferring for a said third group of bales of a layer are effected prior to the conveying, accumulating and transferring steps for the other two groups of the layer while, with respect to the remaining alternating layers, the opposite is true, thereby providing a stack wherein the transverse bales of adjacent layers are disposed at opposite sides of the stack.

42. In a method as claimed in claim 40, wherein said one group and said second group each include five bales, said third group having two bales therein.

43. In a method as claimed in claim 36; and after displacing the stack from the stack-building area, retrieving the same into said area and transporting the retrieved stack in said area, the stack remaining upright during said retrieval and transport.

44. In a method as claimed in claim 43; and instead of bodily displacing the stack out of the stack-building area, unloading one bale at a time from the stack using steps that include:
retaining the next-to-the-last layer at said second elevation and using said retention of the next-to-the-last layer to retain and support all layers above said next-to-the-last layer;
while the last layer is at said one elevation, progressively moving the last layer out of said stack-building area so as to present groups of bales from the last layer to means for conveying the bales of each group seriatim toward a remote location, said moving step being carried out until all bales of the last layer are out of said area; and
repeating said retaining, lowering and moving steps with respect to the remaining layers of the stack until the stack has been completely disassembled.

* * * * *